(12) United States Patent
Ono et al.

(10) Patent No.: US 6,541,627 B1
(45) Date of Patent: Apr. 1, 2003

(54) CELLULOSE DISPERSION

(75) Inventors: Hirofumi Ono, Takatsuki (JP); Toshihiko Matsui, Takatsuki (JP); Ikuya Miyamoto, Ibaraki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/555,639

(22) PCT Filed: Dec. 3, 1998

(86) PCT No.: PCT/JP98/05462
§ 371 (c)(1),
(2), (4) Date: Jun. 1, 2000

(87) PCT Pub. No.: WO99/28350
PCT Pub. Date: Jun. 10, 1999

(30) Foreign Application Priority Data

| Dec. 4, 1997 | (JP) | 9-348698 |
| Apr. 14, 1998 | (JP) | 10-102898 |
| Apr. 27, 1998 | (JP) | 10-116570 |
| May 7, 1998 | (JP) | 10-124939 |

(51) Int. Cl.⁷ .............. C08B 16/00; C07H 1/00
(52) U.S. Cl. .......... 536/56; 536/57; 536/1.11; 536/123.1; 536/123.12; 536/124; 536/126; 106/163.01
(58) Field of Search .............. 536/56, 57, 1.11, 536/123.1, 123.12, 124, 126; 106/163.01

(56) References Cited

U.S. PATENT DOCUMENTS 5,123,962 A * 6/1992 Komuro et al.
5,372,998 A * 12/1994 Kokubo et al.
5,540,874 A * 7/1996 Yamada et al.

FOREIGN PATENT DOCUMENTS

| EP | 0460609 A | 12/1991 |
| JP | 3-111426 | 5/1991 |
| JP | 5-200268 | 8/1993 |
| JP | 06 145202 A | 5/1994 |
| JP | 8-283457 | 10/1996 |
| SU | 1178763 A | 9/1985 |

* cited by examiner

Primary Examiner—James O. Wilson
Assistant Examiner—Traviss C. McIntosh, III
(74) Attorney, Agent, or Firm—Pennie & Edmonds LLP

(57) ABSTRACT

A cellulose dispersion which is a dispersion comprising a dispersing medium and a cellulose having a fraction of cellulose I type crystal component of not more than 0.1 and a fraction of cellulose II type crystal component of not more than 0.4 and in which the average particle diameter of the constitutive cellulose is not more than 5 μm. A cellulose particulate and a cellulose composite particulate which have an average particle diameter of 0.2 to 20 μm, a ratio of long diameter (L) to short diameter (D) observed through a scanning electron microscope (L/D) of not more than 1.2 and a coefficient of aggregation of 1.0 to 3.0. The present invention provides a cellulose dispersion which has an excellent effect such as dispersion stability or the like and is high in transparency. Moreover, it provides a cellulose particulate and a cellulose composite particulate which have such performances as no rough feel, excellent rolling properties, high dispersibility and the like.

29 Claims, 12 Drawing Sheets

50 μm

50 μm 0.1 μm

3 μm

10 μm

10 μm

CELLULOSE DISPERSION

This application is a 371 of PCT/JP98/05462 Dec. 3, 1998.

This invention relates to a cellulose dispersion in which a cellulose is highly dispersed in a dispersing medium and which is high in transparency; to a spherical particulate or spherical composite particulate which is low in aggregable properties and large in hardness; and to a process for producing the same.

BACKGROUND ART

A cellulose which is a natural polymer or a particulate whose starting material is a cellulose and dispersions of them have been widely used as an additive agent for drug-molding; a food additive; a cosmetics additive; a binder for various molding purposes; a filter aid; a support for sustained release drug; and the like.

A dispersion in which a cellulose is the starting material and a cellulose particulate are, in all cases, used as a composite system in which it is mixed with and dispersed in other functional materials (drugs, oily agents, perfumes and the like). Therefore, they are required to have a function for highly dispersing the functional materials and allowing them to stably exist in the composite system (referred to hereinafter as the dispersion stability) is required.

However, the conventional cellulose dispersion has such a problem that the cellulose aggregates in an acidic area of $pH \leq 3$ and it does not function as an additive in acidic products. Moreover, a water-soluble polymer containing a water-soluble cellulose derivative (hydroxyethylcellulose, carboxymethyl cellulose or the like), though it is not a cellulose, has a high dispersion stability in a composite system and is utilized as a thickening agent for paints, cosmetics, cataplasms for drug or the like. These are usually used in the form of an aqueous solution of about 0.5 to 3% by weight; however, for example, it is difficult for a water-soluble cellulose derivative for a water-based paint to always keep the required good balance between viscosity and thixotropic properties (a phenomenon that the viscosity is high at a low shear rate and a viscosity reduction takes place at a high shear rate), and those having a such a viscosity that they are spreadable are low in thixotropic properties, and have problems such as run of liquid being caused and the like. In addition, the sticky feel and spinnability characteristic of a water-soluble polymer are often disliked in some use fields and problems have remained.

Moreover, it has long been desired to substitute for the water-soluble polymer a cellulose dispersion which is a natural material and has a thickening action and a dispersing action for the utilization as a coating agent such as a paint, a cosmetic or the like; however, the conventional cellulose dispersion lacks the smoothness and transparency of coating surface and the improvement of these properties has been required. That is to say, there has been desired a dispersion in which the conventional cellulose particulates are much more highly dispersed.

Furthermore, the water-soluble polymers are also employed in uses requiring the transparency of solution as in cosmetic emulsions and gel-like hair-dressing agent. The conventional cellulose dispersion is a uniformly white-turbid, opaque suspension and has been unable to be utilized at all in this field. In addition, even when a coloring material such as a dye, a pigment or the like is incorporated into the existing cellulose dispersion, there have been problems such as the color developability characteristic of the coloring material being unable to be secured and the like.

Accordingly, in order to impart to the cellulose dispersion a further function such as dispersibility, smoothness, transparency or the like to make it applicable to a wider industrial field, it has been desired to impart thereto so high a dispersion-stability as to be comparable to that of the water-soluble polymer in the complex system and further desired to finely divide the same and impart transparency thereto.

The conventional cellulose dispersions used as various additives is generally composed of a dispersing medium (usually water) and particulates obtained by a method for producing "microcrystalline cellulose (MCC)" and "microfibrilated cellulose (MFC)".

As the prior art concerning the cellulose dispersions, JP-A-3-163,135 discloses a dispersion of a finely divided cellulose material. JP-A-3-163,135 discloses a technique of producing, by a depolymerization treatment and a subsequent wet grinding treatment, a suspension containing at least 2% by weight of an atomized cellulosic material in which the particle diameters whose integrated volume is 50% in the particle diameters distributions with relation to a volume are 0.3 to 6 µm and the integrated volume proportion of particles of not more than 3 µm in diameter is not less than 25%. There is a statement to the effect that as the starting cellulose material used for the production of the above dispersion, a regenerated cellulose material can also be used, but there are no working examples, and according to the above method, there are not obtained those that the fraction of cellulose II type crystal component is not more than 0.4 even when said starting material is used. Moreover, it is stated that a degree of polymerization of not more than 300 is preferred; however, substantially, it is considerably higher than the average degree of polymerization (DP) of the cellulose of the present invention. In addition, as shown in Comparative Example 2 of the present specification, no dispersion having transparency is obtained.

Furthermore, JP-A-3-163,135 states that by finely dividing the cellulose material in the cellulose dispersion, the development of thixotropic properties, water-retention characteristics, viscosity, dispersion stability and the like are improved, and simultaneously therewith, when it is used as, for example, a food additive, the rough feel, foreign matter feel and powdery feel of the food can be diminished and an improvement of sense of touch and an increase of the addition amount can be expected. The same publication points out simultaneously the limit of degree of finely dividing a group of cellulose type particulate additives, the deterioration of dispersion stability by too finely dividing them, the lower limit value (2% by weight) of the particulate concentration in the suspension at which the dispersion stabilization effect is exhibited, and the like.

JP-A-56-100,801 discloses a microfibrilated cellulose. This fibrilliform cellulose is ground in the form of fibers, and there are obtained those having a long diameter (L) of about 100 µm though and having a short diameter (D) of not more than 1 µm (L/D is large and the anisotropy is high). When a dispersion is intended to be prepared from such a microfibrilated cellulose, the dispersion of the present invention low in crystallinity, low in degree of polymerization and high in transparency which comprises a cellulose II type crystal as the main component is by no means obtained as pointed out in relation to JP-A-3-163,135.

JP-A-9-508,658 discloses a technique of preparing a liquid crystalline cellulose film from a colloidal dispersion composed of particles having a particle diameter of several to several hundreds nm by hydrolyzing natural cellulose particulates in concentrated sulfuric acid at a high temperature (60 to 70° C.). The cellulose crystallite obtained thereby has been substituted by a charge group to a derivative and aggregation and association are inhibited owing to this charge repulsion, and it has neither thickening effect nor dispersion-stabilizing effect of the cellulose additive as aimed at by the present invention and is different in industrial applicability. Specifically, there are stated application examples in which the optical characteristics of a film obtained from a liquid crystalline, colloidal dispersion are utilized. Since in the technique of the above-mentioned publication, sulfuric acid hydrolysis is effected under the conditions that the cellulose crystallite is not dissolved, no one that the fraction of the cellulose I type crystal component is not more than 0.1 is obtained and the surface of the cellulose particle is converted into a derivative in the course of the hydrolysis, so that it is different from the dispersion of the present invention.

In addition, SU 1,178,763 A discloses a method for the hydrolysis of a cellulose, mainly cotton, which comprises the first stage of dissolving a cellulose in 65 to 75% sulfuric acid (aqueous solution) and reprecipitating the cellulose from that solution under the specific conditions to recover the cellulose in a high yield and the second stage including enzyme hydrolysis of the cellulose. This method is one comprising dissolution in an acid, reprecipitation, filtration, washing, drying and subsequent hydrolysis with a cellulase, and hence different from the present invention. In particular, in the cellulase hydrolysis method, the hydrolyzed cellulose is completely depolymerized into glucose through a water-soluble material such as cellobiose or the like. On the other hand, the present invention includes a dispersion composed of a water-insoluble cellulose and a method for producing the same.

Moreover, JP-A-54-160,801 discloses a method comprising recovering a cellulose and producing glucose from the cellulose recovered. This publication describes a method for obtaining glucose which comprises removing a hemicellulose from a cellulose-containing material such as corn cane, bagasse or the like with an about several weight % dilute acid under pressure, dissolving the residue (lignocellulose) in a concentrated acid, subsequently diluting the solution with a selected solvent to reprecipitate the same, recovering the cellulose in a high yield and further hydrolyzing the cellulose thus obtained with a cellulase, a dilute acid or a combination of a cellulase with a dilute acid. The cellulose dispersion of the present invention has not been obtained.

As mentioned above, such a cellulose dispersion that when added in a small amount, it develops a shaping effect such as thickening property, stability of dispersion, emulsion or the like, structure stability, coating film-formability or the like and further that it can be used in a filed in which transparency is required has never been obtained.

Moreover, a cellulosic particulate can be obtained from the cellulosic dispersion by a spray drying method and such a cellulosic particulate has characteristics such as safety resulting from natural material, hygroscopicity and the like, so that various applications in which the characteristics are utilized are expected. However, the conventional cellulosic particulates have such problems as shown below. That is, (1) those having a high dispersion stability in a composite system and a high mechanical strength (for example, hardness) have a relatively large particle diameter and is poor true sphericity. Moreover, (2) those having a high true sphericity is poor in dispersion stability and low in mechanical strength.

For example, such cases that particulates poor in true sphericity, when added to a cosmetic foundation, cannot sufficiently inhibit the rough feel and lackluster feel nor sufficiently secure the smoothness and rolling properties (spreadability) of a coating surface, and the like are caused. Therefore, the particulates are little used in these applications. Even when they are used in a coating solution for print, they are confronted with the same problem. In addition, the particulates poor in strength have such problems that when a container is filled under pressure with a product to which they have been added or the product is coated by a strong pressure, the fracture or collapse of particles is caused, whereby such changes of product performance as deterioration of rolling properties, developing of a rough feel, reduction of volume and the like are caused. It is added that the particle diameter at which human being does not feel the material rough is said to be about 20 µm or less.

As the spherical particulates, there are known particulates made of a synthetic resin such as polymethyl methacrylate, nylon or the like; however, there have been desired cellulose spherical particulates which can be applied to wide uses as an additive and have no problems mentioned above.

As the cellulosic particulates which have heretofore been known, there are those formed by drying a dispersion of MCC or MFC by a spray drying method, those obtained by subjecting a cellulose solution such as a viscose solution or the like to phase separation in the form of liquid drops by an emulsification method and then to solidification with a coagulating agent. The latter is easier than the former for obtaining spherical particulates. A typical, known technique as to cellulose particulates is explained below.

JP-A-3-111,426 discloses a method for producing spherical cellulose particles. It is a method comprising pretreating the starting cellulose by acid hydrolysis, alkali oxidative destruction, enzyme decomposition, steam explosive disintegration or vapor cooking and thereafter subjecting the same to a step of preparing a suspension, a step of wet grinding and a step of drying by a spray drying method to produce particles. It is stated that in this method, a suspension of finely divided cellulose particles having an average particle diameter of 1 to 2 µm obtained by wet-grinding is dried by a spraying method to obtain spherical particles having an average particle diameter of about 3 to 12 µm. According to the knowledge of the present inventors, the above method is basically a method in which the base technique of MCC is combined with the wet grinding and a drying method under the specific conditions, and the spherical particles obtained are highly crystalline. The specification of the above publication has such a statement that a regenerated cellulose can be used as the starting material, but has no working examples. In the above method, even when the regenerated cellulose is used as the starting material, the crystalline state of the cellulose used is maintained, and there is obtained no product having a fraction of a cellulose II type crystal component of not more than 0.4. Moreover, as shown in Comparative Example 13 of the present specification, even when finely divided MCC in the form of a bar is dried/granulated by a spraying method, the true sphericity does not become so high. In addition, the true sphericity has not been quantified. In these respects, it is different from the present invention.

JP-A-5-200,268 discloses a method for producing spherical cellulose particulates having an average particle diameter of not more than 15 µm. The same publication is a technique of producing the above-mentioned spherical cellulose by mixing a viscose emulsion formed by adding a viscose solution and a surface active agent to a water-insoluble dispersing medium with a viscose-coagulation emulsion formed by adding a viscose coagulation to a water-insoluble dispersing medium and subjecting the mixture to reaction.

The viscose liquid used is a dope "for conventional rayon" obtained from cotton linter or pulp. From this statement, the average degree of polymerization of the particles obtained is at least about 300 and different from that of the cellulose of the present invention. Moreover, it is a production method in which a cellulose converted into a derivative is subjected to regeneration and solidification using a surface active agent and a water-containing coagulation such as aqueous sulfuric acid or the like, and therefore, the particulates obtained include voids based on the phase separation method in their interiors and a tendency to become porous is unavoidable. Moreover, substantially no similar prior art references including JP-A-5-200,268 elucidate a specific drying method for obtaining dry particulates from a suspension of these particulates. According to the knowledge of the present inventors, in order to dry porous particulates without aggregating them while the true sphere is maintained, there is a means such as vacuum drying at a low temperature, freeze drying or the like; however, this is very difficult. It is also difficult to purify the cellulose when it is finely divided. That is, guided by the disclosure of JP-A-5-200268, it is very difficult to produce dry particulates having a small porosity and low aggregable properties and maintaining the original spherical shape. Such dry, porous particulates easily undergo collapse, crushing or the like upon strongly crushing or compressing under high pressure. In this respect, they are different from the cellulose particulates of the present invention which have substantially no porosity and a low degree of polymerization and are spherical and large in strength.

Moreover, Preprint of Lecture at the 5th Annual Meeting of Cellulose Society, p. 92 (1998) states a report concerning the preparation of porous cellulose beads having particle sizes of 5 to 10 $\mu$m. The said technique is a technique comprising dispersing a viscose in an alkali solution of a water-soluble polysaccharide, adding sulfuric acid to this dispersion to conduct the coagulation-regeneration of the cellulose and the hydrolysis of the polysaccharide. It reports that because of the porosity, the water-absorbability and oil-absorbability "showed a high value as compared with fibrous cellulose and microcrystalline cellulose". There is a high possibility that the cellulose beads contain a polysaccharide from the production method described in the above preprint, and the function depends upon the porosity thereof. This technique is basically a similar technique to JP-A-5-200,268, and includes the same problems as previously pointed out.

JP-A-8-283,457 discloses a spherical cellulose which is composed of a regenerated cellulose having a crystallinity of not more than 5% and which has a true sphericity of 0.8 to 1.0 and an average particle diameter of 20 to 2,000 $\mu$m and a method for producing the same. The purpose of this invention is to provide a spherical cellulose which has a low crystallinity and is easily subjected to addition reaction and cross-linking reaction, and the utilization field thereof includes a medical substrate, an adsorber, a filler for chromatography and the like. In the method for producing this spherical particle, cellulose is dissolved in a dimethylacetamide/lithium chloride or N-methylpyrrolidone/lithium chloride solvent and thereafter dropped into an alcohol to be coagulated in the form of spheres (dropping method) or the above solution is added to a mixture of a polyhydric alcohol group-containing surface active agent and a dispersing medium and stirred/emulsified to be subjected to dispersive coagulation (dispersive coagulation method).

This spherical particulate has a large particle diameter and is different from the present invention. Moreover, the above publication has a statement to the effect that an organic medium dope of a cellulose is used for avoiding the phenomenon of conversion of the cellulose into one having a low degree of polymerization that the cellulose dope has, and it is clearly different from the present particulate having a low degree of polymerization.

The invention of JP-A-8-283,457 is also a particulate obtained from a cellulose dope and has the above-mentioned problem.

Thus, there have not still been provided cellulose particulates which have a particle diameter of not more than 20 $\mu$m and are in the form of a true sphere, difficult to aggregate and high in particle strength.

DISCLOSURE OF INVENTION

An object of the present invention is to provide a cellulose dispersion which has a high dispersion stability in a level comparable to a water-soluble polymer in a composite system and has a transparency and which is applicable to a wider industrial field as well as a composite cellulose dispersion and a method for producing them.

Another object of the present invention is to provide a spherical cellulose particulate obtained from the above cellulose dispersion as well as a cellulose composite particulate and a process for producing them.

That is to say, the present invention provides a highly functional cellulose dispersion which, as compared with the existing cellulose dispersion, has a very high dispersion stability for suspension, dispersion, emulsion or the like, and can develop excellent thickening properties, shape retention-imparting properties, tissue-imparting properties, cloudy resistance, sizing properties, coating properties, structure stability, gelation properties, surface activity and the like, and which has a high dispersibility (transparency) comparable to water-soluble polymer solutions, and provides a process for producing the same.

Further, the present invention provides a spherical cellulose particulate which is small in particle diameter, difficult to aggregate and high in particle strength as well as a cellulose composite particulate in which the above particulate has been compounded with a functional additive and a process for producing the same.

The present inventors have found that a cellulose dispersion having a specific degree of polymerization and crystallinity and having a peculiar dispersion structure is dispersed in a dispersion so highly as to be comparable to water-soluble polymers and is consequently very much higher in transparency than the conventional cellulose dispersion and also found that particulates obtained from the above dispersion are in the form of spheres and difficult to aggregate and high in particle strength, and have accomplished the present invention.

That is to say, the present invention includes:
(1) a cellulose dispersion which is a dispersion comprising a dispersing medium and a cellulose having a fraction of cellulose I type crystal component of not more than 0.1 and a fraction of cellulose II type crystal component of not more than 0.4 and in which the average particle diameter of the constitutive cellulose is not more than 5 $\mu$m;
(2) the cellulose dispersion according to (1) above, wherein the average degree of polymerization (DP) is not more than 100 and when the cellulose concentration of the cellulose dispersion is adjusted to 0.05% by weight, the transmittance of the cellulose dispersion to a visible light of a wavelength of 660 nm is not less than 40%;

(3) the cellulose dispersion according to (1) or (2) above, wherein the average particle diameter of the constitutive cellulose is not more than 2 μm;

(4) the cellulose dispersion according to (1), (2) or (3) above, wherein when the cellulose concentration is adjusted to 0.05% by weight, the transmittance of the dispersion to a visible light of a wavelength of 660 nm is not less than 80%;

(5) the cellulose dispersion according to (1), (2) or (3) above, wherein the dispersing medium is water and/or an organic solvent;

(6) the cellulose dispersion according to (4) above, wherein the organic solvent is a water-soluble alcohol;

(7) a composite cellulose dispersion which comprises the cellulose dispersion according to (1), (2), (3) or (4) above and a functional additive compatible with the dispersing medium, wherein when the cellulose concentration in the composite cellulose dispersion is adjusted to 0.05% by weight, the transmittance of the dispersion to a visible light of a wavelength of 660 nm is not less than 40%;

(8) the composite cellulose dispersion according to (7) above, wherein the transmittance is not less than 80%;

(9) the composite cellulose dispersion according to (7) or (8) above, wherein the functional additive is selected from the group consisting of a polyhydric alcohol, a water-soluble polysaccharide, a water-soluble polymer and a water-soluble perfume;

(10) a process for producing a cellulose dispersion, which comprises reprecipitating a cellulose solution obtained by dissolving a cellulose in an aqueous inorganic acid solution in water or a coagulating agent containing not less than 50% by weight of water to prepare a cellulose suspension, subjecting the cellulose in the suspension to acid hydrolysis treatment, and subsequently removing the acid from the suspension;

(11) a process for producing a cellulose dispersion, which comprises reprecipitating a cellulose solution obtained by dissolving a cellulose in an aqueous inorganic acid solution in water or a coagulating agent containing not less than 50% by weight of water to prepare a cellulose suspension, subsequently preparing a dehydrated cake of the cellulose from the suspension, thereafter introducing the dehydrated cake into water at not less than 50° C. to subject the cellulose to acid hydrolysis treatment and then removing the acid from the suspension;

(12) the process for producing a cellulose dispersion according to (10) or (11) above, which comprises, after the step of removing the acid from the suspension, further subjecting the suspension to high-power grinding treatment;

(13) the process for producing a cellulose dispersion according to (10), (11) or (12) above, wherein the inorganic acid is sulfuric acid;

(14) the process for producing a cellulose dispersion according to (10), (11) or (12) above, wherein the removal of the acid from the suspension is effected by adjusting the pH of the suspension to not less than 2;

(15) the process for producing a cellulose dispersion according to (10), (11) or (12) above, wherein the water in the cellulose dispersion obtained by removing the acid is replaced with a water-soluble organic solvent;

(16) the process for producing a cellulose dispersion according to (10), (11) or (12) above, wherein a functional additive is added to the cellulose dispersion obtained by removing the acid;

(17) the process for producing a cellulose dispersion according to (16) above, wherein after the step of adding the above functional additive, the dispersion is further subjected to high-power grinding treatment;

(18) a cellulose particulate which is composed of a cellulose having a fraction of cellulose I type crystal component of not more than 0.1 and a fraction of cellulose II type crystal component of not more than 0.4 and which has an average particle diameter of 0.2 to 20 μm, a ratio of long diameter (L) to short diameter (D) as observed through a scanning electron microscope (L/D) of not more than 1.2 and a coefficient of aggregation of 1.0 to 3.0, provided that the coefficient of aggregation=(average particle diameter calculated from the volume reduced distribution obtained by a laser diffraction-scattering type particle size distribution measuring apparatus)/(average particle diameter of volume reduction by a scanning electron microscope);

(19) the cellulose particulate according to (18) above, wherein the average degree of polymerization (DP) is not more than 100 and L/D value after pressing at a pressure of 100 kgf/cm$^2$ is not more than 1.2;

(20) a cellulose composite particulate which is a particulate in which at least one functional additive is dispersed in the cellulose particulate according to (18) or (19) above and which particulate has an average particle diameter of 0.2 to 20 μm, a ratio of long diameter (L) to short diameter (D) as observed by a scanning electron microscope (L/D) is not more than 1.2 and a coefficient of aggregation of 1.3 to 3.0;

(21) the cellulose composite particulate according to (20) above, wherein the functional additive is at least one member selected from the group consisting of an oil type compound, a water-soluble polymer, a humectant, a surface active agent, a metal oxide, an ultraviolet screener, an inorganic salt, a metal powder, a gum, a dye, a pigment, carbon black, a silica compound, a latex, an emulsion, an amino acid, a perfume and an antiseptic agent;

(22) a process for producing a cellulose composite particulate which comprises subjecting the cellulose dispersion according to (1), (2), (3) or (4) above to granulation and drying by a spray drying method,

(23) a process for producing a cellulose composite particulate, which comprises mixing the cellulose dispersion according to (1), (2), (3) or (4) above with at least one functional additive and then subjecting the resulting mixed liquid to granulation and drying by a spray drying method;

(24) a cellulose coating film obtained by coating the cellulose dispersion according to (1), (2), (3) or (4) above on the surface of an inorganic material substrate, a plastic substrate or a paper and then drying the same; and

(25) a cellulose composite coating film obtained by coating the composite cellulose dispersion according to (7), (8) or (9) above on the surface of an inorganic material substrate, a plastic substrate or a paper and then drying the same.

BEST MODE FOR CARRYING OUT THE INVENTION

In the present invention, the fractions of cellulose I and cellulose II type crystal components ($x_I$ and $x_{II}$) are calculated according to the following procedure by a wide-angle X ray diffractometry.

As the fraction ($x_I$) of cellulose I type crystal component, there is used a value determined by the following equation (1) from the absolute peak intensity ho at $2\theta=15.0°$ attributed to the (110) peak of the cellulose I type crystal and the peak intensity $h_1$ from the base line in this spacing in the wide-angle X-ray diffraction pattern obtained by grinding a dry cellulose sample into a powder and forming the powder into a tablet and subjecting the tablet to a reflection method using ray source CuKα.

Similarly, as the fraction ($x_{II}$) of cellulose II type crystal component, there is used a value determined by the following equation (2) from the absolute peak intensity $h_0^*$ at $2\theta=12.6°$ attributed to the (110) peak of the cellulose II type crystal and the peak intensity $h_1^*$ from the base line in this spacing in the wide-angle X-ray diffraction pattern obtained by grinding a dry cellulose sample into a powder, forming the powder into a tablet and subjecting the tablet to a reflection method using ray source CuKα.

$$x_I = h_1/h_0 \quad (1)$$

$$x_{II} = h_1^*/h_0^* \quad (2)$$

Figure 1:
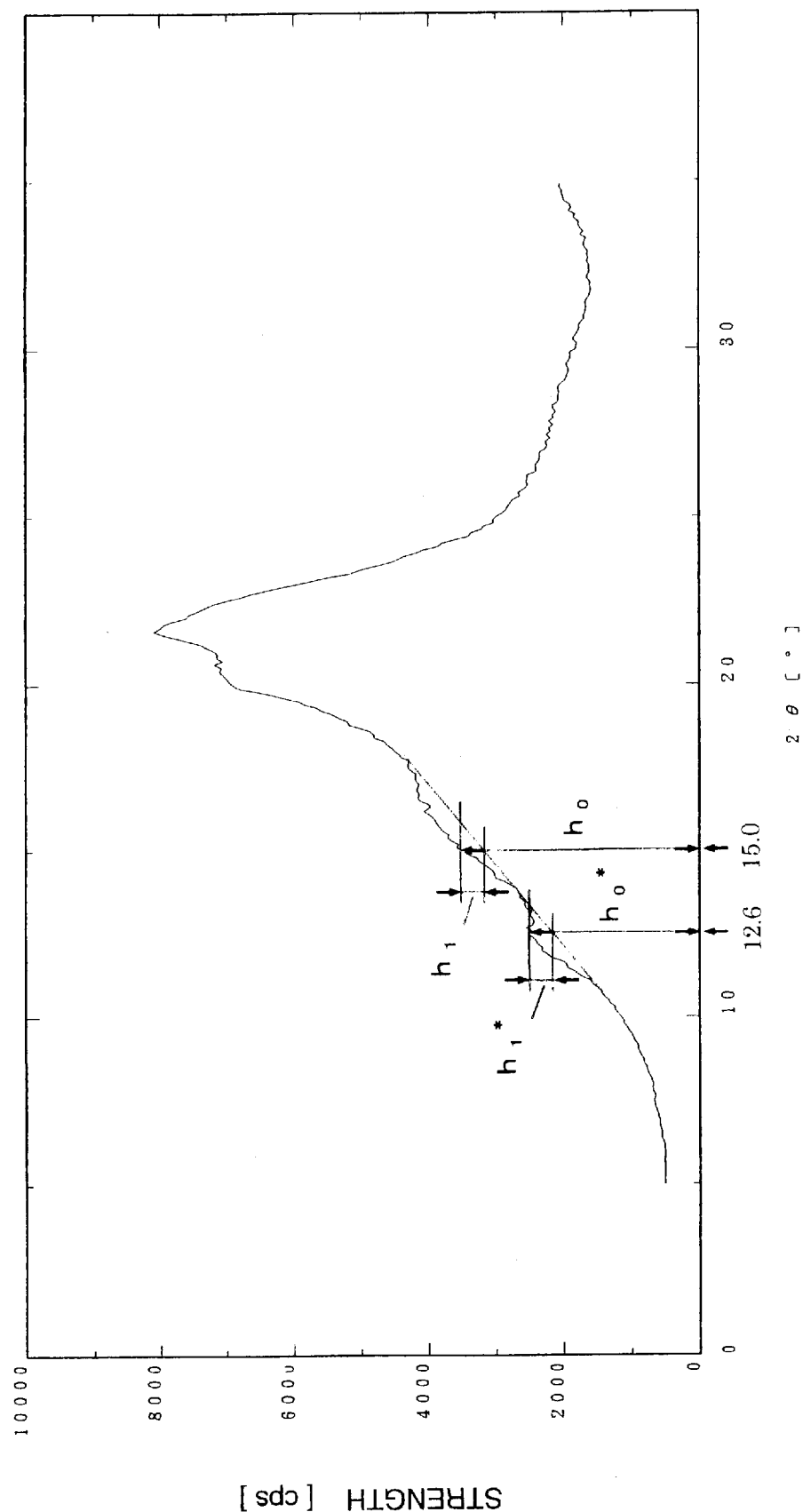
FIG. 1 is an explanatory view showing the method of determining $h_0$, $h_1$, $h_0^*$ and $h_1^*$ in a wide-angle X ray pattern.

In FIG. 1, there is shown a schematic diagram for determining $x_I$ and $x_{II}$.

Incidentally, a dispersing medium-containing cellulose sample as in the dispersion of the present invention is dried by a means such as a vacuum drying method or the like to obtain a dry cellulose sample.

As the average degree of polymerization (DP) defined in the present invention, there is adopted a value obtained by calculation according to the following viscosity equation (3) and the reduction equation (4) from the intrinsic viscosity number [$\eta$] obtained by measuring (25° C.) with a Ubbellohde viscometer the specific viscosity of a dilute cellulose solution obtained by dissolving the above-mentioned dry cellulose sample in cadoxen:

$$[\eta] = 3.85 \times 10^{-2} \times M_w^{0.76} \quad (3)$$

$$DP = M_w/162 \quad (4).$$

The transmittance in the present invention is measured with a visible ultraviolet spectrophotometer (Visible Ultraviolet Spectrophotometer UV-2500PC manufactured by Shimadzu Corp.). First of all, a dispersion in which the cellulose concentration has been adjusted to 0.05% is subjected to ultrasonic treatment for 10 minutes, and a quartz cell having an optical path length of 1 cm is filled with the dispersion as rapidly as possible, and the transmittance is defined as the percentage (%) of the ratio of the intensity of incident light at this time ($I_0$, the intensity of light which has transmitted a control cell when the control sample is water) and the intensity of transmitted light ($I_t$, the intensity of light which has transmitted the sample cell) ($I_t/I_0$). The adjustment of the cellulose concentration in the dispersion is effected by dilution with water regardless of the composition of the dispersing medium in the dispersion.

The transmittance of visible light of a wave-length of 660 nm is generally utilized as a measure for indicating turbidity of solution, film or the like.

In this connection, the highly crystalline cellulose particulate having a particle diameter of about not less than 20 $\mu$m settles immediately in a dispersing medium such as water, an alcohol or the like and hence the measurement of transmittance is substantially impossible. However, from such a cellulose particulate cannot be expected at all the dispersion high in transparency and uniformity aimed at by the present invention.

The average particle diameter of the dispersion is measured by a laser diffraction type particle size distribution measuring apparatus (Laser Diffraction/Scattering Type Particle Size Measuring Apparatus LA-920 manufactured by HORIBA Ltd.; the lower detection value being 0.02 $\mu$m). In order to measure the particle diameter in the state that the association between particles in the dispersing medium is disconnected as much as possible, a sample is prepared by the following process. The dispersion is diluted with water so that the cellulose concentration becomes about 0.5% and thereafter mixing treatment is effected by a blender having a capability of a revolution rate of not less than 15,000 rpm for 10 minutes to prepare a uniform suspension. Subsequently, this suspension is subjected to ultrasonic treatment for 30 minutes and the water dispersion sample obtained is fed to the cell of a particle size distribution measuring apparatus and then subjected to ultrasonic treatment again (3 minutes), after which a particle size distribution is measured. The average particle diameter in the present invention corresponds to a weight average particle diameter determined from the particle size distribution with relation to a volume calculated from the Mie scatter theoretical formula.

As the average particle diameters of the cellulose particulate and the cellulose composite particulate, there are observed through a scanning electron microscope (Model S-800A manufactured by Hitachi, Ltd.) and adopted values obtained by measurement by the following method:

A fine powder sample is placed on a sample stand for pre-observation of electron microscope and subjected to vapor deposition of a metal such as gold, platinum or the like by an ion spattering apparatus or the like to prepare a sample of microscope. As to the average particle diameter, particle diameters of 50 particles sampled at random from a picture obtained by observing the said sample at an accelerating voltage of 5 KV at a magnification of 3,000 are measured and a weight average particle diameter is determined.

Moreover, as the ratio of long diameter (L) to short diameter (D) of the particulate, the long diameters (L) and the short diameters (D) are measured according to the above-mentioned method for determining the average particle diameter and an average value thereof is adopted.

Furthermore, the coefficient of aggregation of cellulose particulate is defined by (average particle diameter calculated from the distribution with relation to a volume obtained by laser diffraction-scattering type particle size distribution measuring apparatus)/(volume-average particle size by a scanning electron microscope). In the present invention, the coefficient of aggregation is calculated as a ratio of the weight average particle diameter obtained with a laser diffraction-scattering type particle size distribution measuring apparatus manufactured by HORIBA Ltd. (LA-290/unit for dry) to the weight average particle diameter by the above-mentioned scanning electron microscope.

The average particle diameter by a scanning electron microscope corresponds to the case where the coefficient of aggregation is 1.00. On the other hand, the average particle diameter obtained by use of the above-mentioned particle size distribution measuring apparatus is the average particle diameter of particulates which have collected in the powder form, and reflects the aggregation state inherent in the particulate. Accordingly, by comparing the ratios, the "degree of easiness of aggregation" which the particulate has can be evaluated.

The degree of fracture and deformation by pressing of the particulates of the present invention is determined by the following method. 0.2 g of dry particulates are sampled, a tableting machine having a diameter of 12.5 mm (manufactured by Shimadzu Corp.) is filled with them and subjected to sucking for 3 minutes under reduced pressure of not more than 600 mmHg to effect preliminary molding and subsequently subjected to compression molding for 3 minutes at a pressure of 100 kgf/cm$^2$. The pellets of particulates after the tableting are pulverized carefully while tapped with an agate-made pestle to finely divide them. The finely divided sample is observed through a scanning electron microscope (Model S-800A manufactured by Hitachi, Ltd.) to check the fracture and deformation of the original particulates. Decision of whether or not fracture and deformation have been caused is made by measuring the average L/D value of 50 particulates sampled at random. When the L/D value is not more than 1.2, it is decided that fracture and deformation are not caused.

The present invention is a cellulose dispersion which comprises a dispersing medium and a cellulose having a fraction of cellulose I type crystal component of not more than 0.1 and a fraction of cellulose II type crystal component of not more than 0.4, and in which the average particle diameter of the constitutive cellulose is not more than 5 μm and this cellulose is in the high association state in the dispersing medium.

In the present invention, the crystallinity of the cellulose in the dispersion and the dispersion state in the dispersing medium are important.

The cellulose in the dispersion of the present invention has such a low crystallinity that the amount of cellulose I type crystal component ($x_I$) is not more than 0.1, preferably not more than 0.06, and the amount of cellulose II type crystal component ($x_{II}$) is not more than 0.4, preferably not more than 0.3. The fraction of the crystal components of cellulose in the dispersion of the present invention ($x_C$, namely the total sum of $x_I$ and $x_{II}$) can be held to a value approximately close to 0.

Incidentally, MCC and MFC have the crystal form of natural cellulose (cellulose I type) and the fraction of the crystal component thereof ($x_I$) is usually not less than 0.6. Moreover, the average degree of polymerization of MCC is 100 to 300 and that of MFC is not less than 300.

Also, the fraction of cellulose II type crystal component of a regenerated cellulose fiber (cuprammonium rayon fiber or rayon fiber) is greatly dependent upon the production method, though it is usually 0.4 to 0.6. Accordingly, the $x_{II}$ of the cellulose obtained by acid hydrolysis of these fibers becomes a value greatly exceeding 0.4.

In general, in the hydrolysis reaction, lowering the degree of polymerization and finely dividing are achieved by preferentially cutting the molecular chain from the noncrystalline (amorphous) or low crystalline region of the cellulose. That is to say, the cellulose after completion of hydrolysis is always higher in crystallinity and lower in degree of polymerization than the starting cellulose. Therefore, the cellulose obtained by a method of producing MCC or MFC from pulp or cotton which is originally high crystalline is very high crystalline. The cellulose of the dispersion of the present invention is characterized by being low crystalline.

Moreover, the dispersion of the present invention is in the state that the cellulose is highly associated in the dispersing medium and the average particle diameter of the constitutive cellulose is not more than 5 μm, preferably not more than 3.5 μm and more preferably not more than 2 μm, as measured by the method defined in the present invention. The lower limit of the average particle diameter can be held to about 0.02 μm which is close to the detection lower limit value of the measurement method defined in the present invention.

The "average particle diameter of the constitutive cellulose" in the present invention means the size of "spread (diameter)" which the cellulose has when the microgel of cellulose isotropically associated and dispersed in the dispersing medium has been dispersed as finely as possible by a means such as ultrasonic wave or the like according to the method of measuring the average particle diameter in the present invention. Such a handling is for distinguishing the form of the cellulose of the present invention present in the dispersing medium from the form of the cellulose particulate of the existing MCC or MFC present in the suspension because the two are clearly different.

Shown below are three experimental proofs relating thereto.

Figure 2:
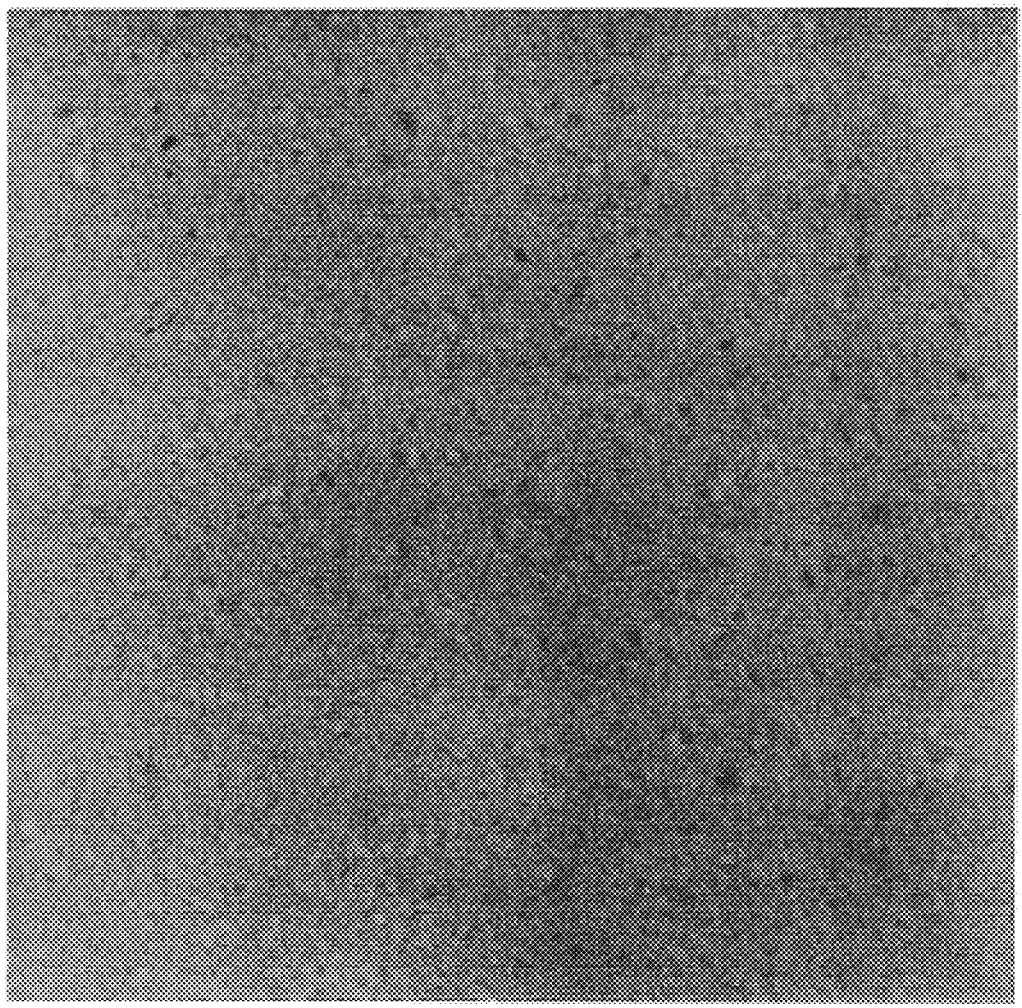
FIG. 2 is an optical micrograph of the S16C sample.
Figure 3:
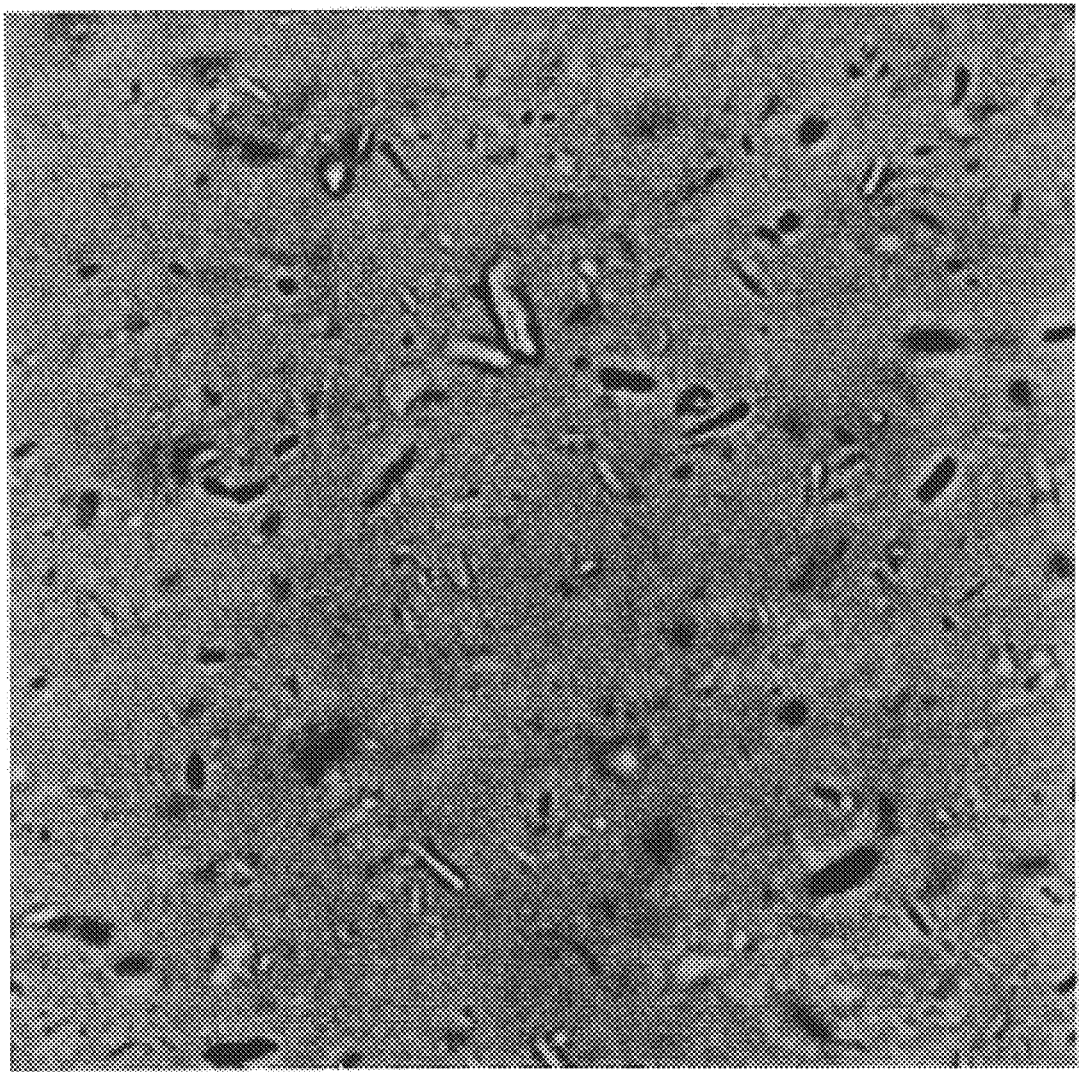
FIG. 3 is an optical micrograph of the R4 sample.

First of all, FIG. 2 shows the optical micrograph of the water dispersion of the present invention that the average particle diameter has been adjusted to about 3 μm and FIG. 3 shows the optical micrograph of a water dispersion of the existing finely divided cellulose (MCC, average particle diameter: about 3 μm).

From FIG. 2, it is seen that in the dispersion of the present invention, no particle can be definitely confirmed by an observation through an optical microscope.

On the other hand, in FIG. 3, a crystal lump of the finely divided cellulose having a shape anisotropy is clearly observed. From this result, it is seen that the cellulose of the present invention is very highly dispersed in the dispersing medium (water in this case) as compared with the finely divided cellulose having the same particle diameter.

Figure 4:
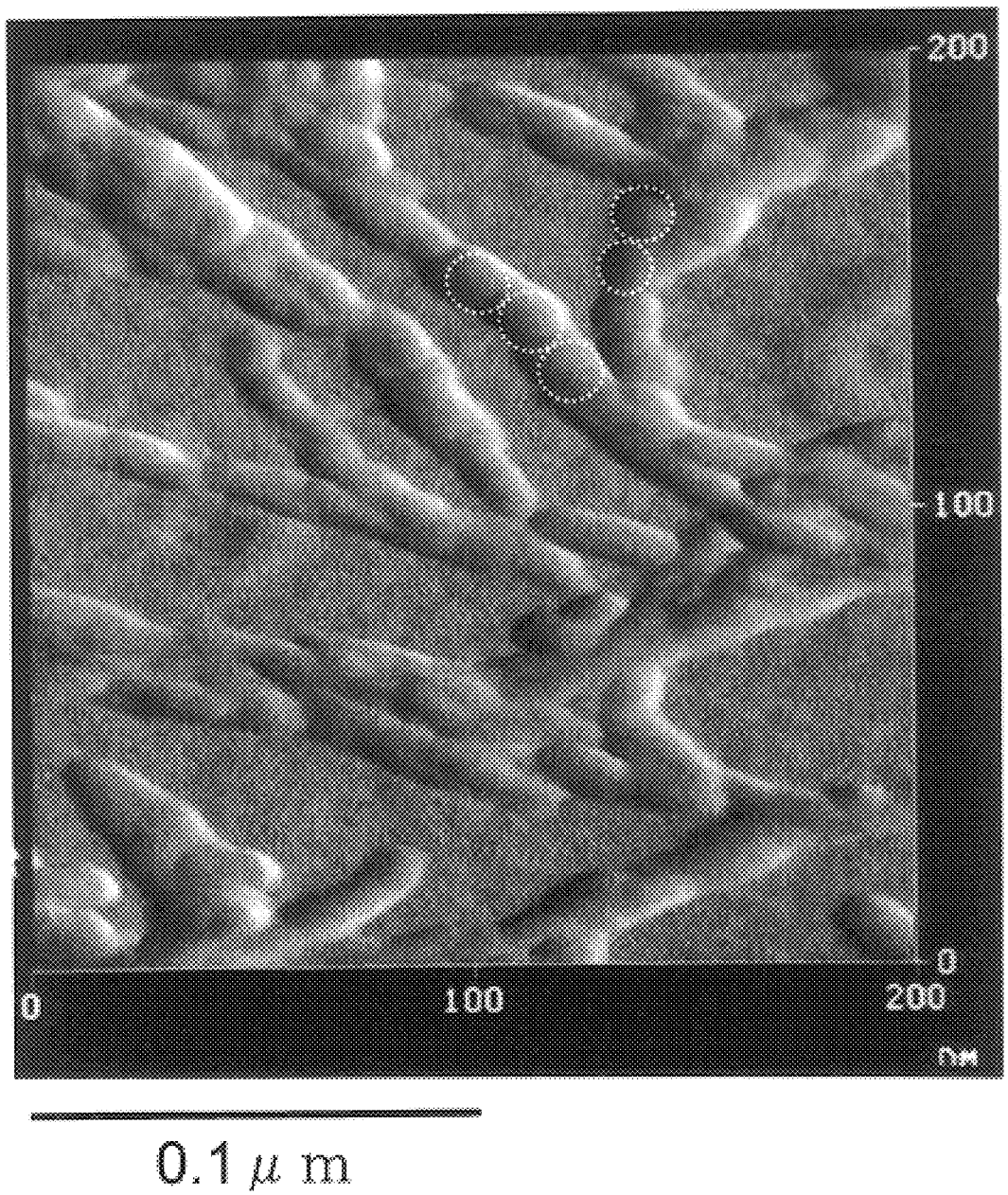
FIG. 4 is a scanning probe microscope picture of the cast surface of the S16A sample.

A photograph by a canning probe microscope (SPM, Nano Scope Model IIIa manufactured by Digital Instruments Company, tapping mode: field of view of 200 nm×200 nm) of the surface obtained by casting the water dispersion of the present invention having a cellulose concentration of 0.005% by weight on glass for preparation and drying the same is shown in FIG. 4. Observed is the fibrilliform structure in which spherical particles having a diameter of about 0.01 µm (shown by a white enclosing dotted line in the figure) are connected in the moniliform shape.

The cellulose contained in the dispersion of the present invention is considered to be such a fine fibrilliform material.

The conventional finely divided cellulose dispersion is basically a dispersion of cellulose lump obtained by finely dividing a crystal lump of the starting cellulose to such a degree that the short diameter is several tens µm to not more than 1 µm (L/D becomes even not less than 10), and the structure that the connection of fine, spherical particles is isolated as in the present invention is observed by no means.

Figure 5:
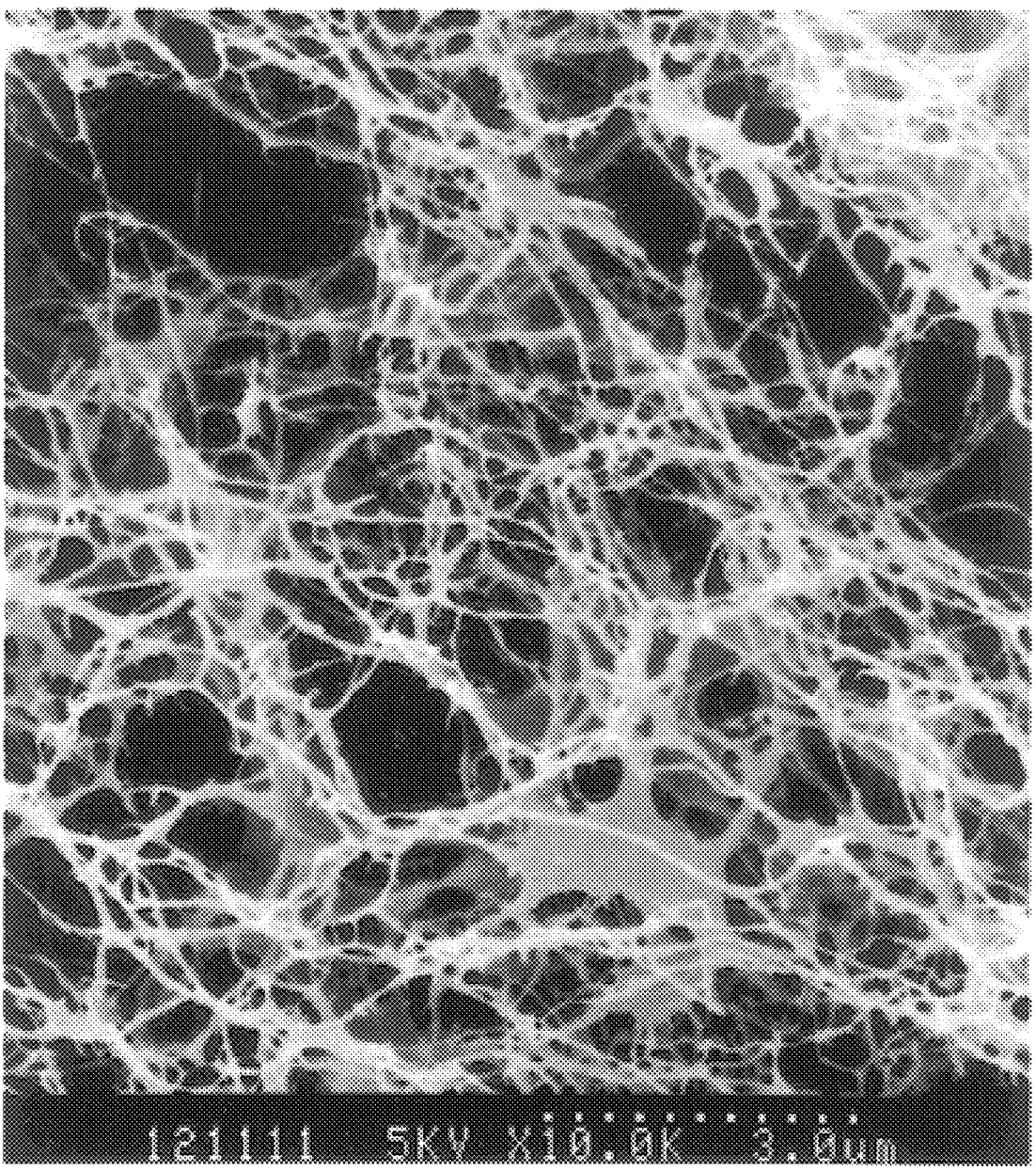
FIG. 5 is a scanning electron micrograph of the S16B sample.

Further, shown in FIG. 5 is a scanning electron micrograph of the dispersion of the present invention which has been freeze-dried.

It is observed that strip-shaped, fibrilliform materials having a width of not more than 0.1 µm are innumerably entangled to constitute a reticulate structure. It is inferred that in the dispersion of the present invention, this reticular structure observed in the dry state is isotropically dispersed in a more dilute state in the dispersing medium, associated in a certain limited size and present as a microgel.

Thus, the cellulose particle of the present invention has very high associating properties and the size of the "spread" is varied depending upon the degree of disconnection of the association state. For example, the average particle diameter of the dispersion of the present invention is in some cases measured as about several hundreds µm when a sample as allowed to stand for a long period of time is subjected to measurement without being subjected to ultrasonic treatment, while when the same dispersion is subjected to measurement by the particle diameter measuring method defined in the present invention, the average particle diameter is detected as not more than 5 µm. This proves that in the dispersion of the present invention, a cellulose having a small particle diameter is very highly associated.

In the dispersions of MCC and MFC, usually, such an extreme change of average particle diameter as illustrated is not observed. That is, it is inferred that this will be because the basic unit of MCC and MFC is composed of a stick-shaped material more coarse and more rigid than in the dispersion of the present invention, and hence, the association between particles is relatively mild.

The dispersion of the present invention therefore develops an excellent function and effect which have never been reached by the conventional finely divided cellulose as to thickening properties, dispersion stability, emulsion stability, water-retention characteristics, hygroscopicity, transparency and the like.

The cellulose in the dispersion of the present invention has preferably an average degree of polymerization (DP) of not more than 100, more preferably not more than 50.

When the DP of cellulose is not more than 100, a dispersion excellent in associating properties and transparency is obtained.

The object of the present invention is to provide a dispersion of a water-insoluble cellulose, and the average degree of polymerization (DP) is not less than 20. Those having a degree of polymerization of 7 to 10 or less exhibits water-solubility and hence are not desirable.

The cellulose dispersion of the present invention has a transparency and the transmittance of a water dispersion having a cellulose concentration of 0.05% by weight to a visible light of a wavelength of 660 nm is preferably not less than 40%, more preferably not less than 60% and much more preferably not less than 80%.

In the dispersion having so high a transparency that the transmittance defined in the present invention is not less than 40%, the average particle diameter of the cellulose is not more than 5 µm. In particular, the dispersion of the present invention in which the average particle diameter is not more than 3.5 µm has generally a transmittance of not less than 60%. In the results of the experiments of the present inventors, none of the existing dispersions of cellulosic particulates satisfy the requirements of the present invention or show the transmittance of the present invention.

In the dispersion having a transmittance of not less than 80%, the average particle diameter of the cellulose has a value of not more than 2 µm. The average particle diameter of the dispersion of the present invention becomes about 0.02 µm which is the detection lower limit value of the measuring apparatus in an appropriate case, and the transmittance of the dispersion is not less than 95% and can be increased to such an extent as to be approximately comparable to deionized water. The dispersion having a transmittance of not less than 80% develops more remarkably a function and effect as to thickening properties, dispersion stability, emulsion stability, water retention characteristics, hygroscopicity, transparency and the like.

When the cellulose in the dispersion of the present invention is more highly finely divided to hold the average particle diameter to not more than 0.8 µm, there can be also obtained a dispersion having such a very excellent transparency that the transmittance is not less than 50% as measured at a cellulose concentration of 2% by weight in the transmittance measurement defined in the present invention. Also, there can be obtained a dispersion so excellent in transparency that when the cellulose concentration is 1% by weight the transmittance is 90% and when the cellulose concentration is 0.5% by weight the transmittance is 93%.

The above-mentioned dispersion of the present invention exerts an excellent function and effect as stated below.

Firstly, it can be used in substantially all fields in which the existing dispersions of finely divided cellulose can be used. Secondly, it can develop better dispersion stabilizing effect, thickening effect, thixotropy effect, moisture retention effect, shape retention effect and the like than the existing ones. Therefore, when the same effect is intended to be obtained, a smaller addition amount or use amount is sufficient. Thirdly, there are the following functions which only the dispersion of the present invention can exert on its own. That is to say, (1) since it is a dispersion having a very high transparency, it can be employed in uses which the maintaining of transparency is necessary, for example, inks, pigments, cosmetics and the like. In particular, a coating film of a dispersion having a transmittance of not less than 80% coated on a glass plate is so transparent that unless observed carefully the dispersion being coated cannot be noticed. (2) It has an excellent film formability. The conventional cellulose dispersion, because of its particle diameter and anisotropy, is poor in film formability itself or forms only a coating film whose surface is violent in irregularity and easy to peel even when the dispersion is adjusted to a viscosity suitable to coating. From the dispersion of the present invention can be formed a strong and highly transparent coating film having a smooth surface. (3) It has an excellent emulsion stability and an excellent surface activating effect. This performance is also a performance which the existing cellulose dispersion cannot be expected to have. (4) That it is poor in stickiness and smooth and has no sticky feel is also the highly important point.

The dispersion of the present invention, even when the cellulose concentration is 2% by weight, has so high a viscosity as to be usable as a thickening agent unlike the finely divided cellulose described in JP-A-3-163,135, shows a gel state and simultaneously has a high dispersion stability. Moreover, JP-A-3-163,135 describes that when the particle diameter is held to not more than 0.3 μm, the stability of dispersion is deteriorated; however, such a knowledge is not applied at all to the dispersion of the present invention. In particular, the dispersion of the present invention in which the transmittance is not less than 80% and the average particle diameter is not more than 0.3 μm is in the gel form even when the cellulose concentration is 1% by weight and can retain its shape and is also excellent in dispersion stability.

The cellulose concentration in the present invention is usually in a range of 0.3 to 10% by weight, preferably 0.5 to 6% by weight, but may be appropriately determined depending upon the performance required. For example, when the dispersion of the present invention is used as a cleansing material for the purpose of imparting moisture retention after washing the face, the cellulose concentration may be not more than 0.5% by weight and when a gel retention ability is required, the concentration is desirably not less than 1.5% by weight. In the dispersion of the present invention in which the transmittance is not less than 80%, when the cellulose concentration is not less than 1.5% by weight, it follows that thixotropic properties are exhibited as its properties. By the properties, it keeps shape retention characteristics in a tube, while when extruded therefrom, it becomes a liquid state, so that it exerts its ability in field requiring such characteristics. In addition, when mixed with other components, it exhibits properties as a liquid during the mixing, so that it is practically usable. When the cellulose concentration is not more than 1.5% by weight, it does not exhibit marked thixotropic properties and shows properties as solution. This dispersion can be employed as it is in some uses; however, it can be effectively utilized as a mother liquor for a composite cellulose dispersion.

As stated above, almost all of the conventional finely divided cellulose dispersions are prepared from a natural cellulose by a physical method or a chemical method or a combination of the two methods. According to these methods, the average degree of polymerization does not become not more than the so-called lower limit of degree of polymerization (LODP, about 100 in the case of natural cellulose and about 40 in the case of regenerated cellulose). Moreover, it is also known that the crystallinity of the cellulose obtained by the same method becomes always higher than the crystallinity of the starting cellulose. Furthermore, even when the highly crystalline, finely divided cellulose is dispersed in a dispersing medium, the difference of refractive index from that of the medium is large and the medium is not sufficiently dispersed into the cellulose interior, so that the dispersion obtained is only an opaque dispersion.

Moreover, the dispersion of the present invention is hydrophilic and simultaneously oleophilic (so-called amphipathic), and has also a high interaction of hydroxyl group characteristic of cellulose. The dispersion of the present invention can be used in admixture with many functional additives because a cellulose having these properties is highly finely divided and present in the system, and becomes a dispersion having both the excellent characteristics which the cellulose dispersion of the present invention has and the characteristics which the functional additives have (the above dispersion is referred to hereinafter as the composite cellulose dispersion).

As the functional additives which can be used in the composite cellulose dispersion of the present invention, there are mentioned polyhydric alcohols, water-soluble polysaccharides, water-soluble polymers, water-soluble perfumes and the like. More particularly, the polyhydric alcohols include diethylene glycol, dipropylene glycol, 1,3-butadienediol, sorbitol, maltitol and the like. The water-soluble polysaccharides include dextran, sodium chondroitin sulfate, amylose, amylopectin, pullulan, agarose, sodium pectate, sodium alginate, gum arabic, xanthan gum, guar gum, karaya gum, tragacanth gum, casein sodium, gelatin and the like. The water-soluble polymers include hydroxyethylcellulose, hydroxypropyl cellulose, methyl cellulose, carboxymethyl cellulose, carboxyethyl cellulose, polyacrylamide, poly(sodium acrylate), polyvinylpyrrolidone and the like. The water-soluble perfumes include acetylmethylcarbinol, ethyl acetoacetate, anisaldehyde, methyl anthranilate, methyl benzoate, ethyl isovalerate, allyl isothiocyanate, isoamyl formate, ethyl formate, cinnamic aldehyde, cinnamic acid, isobutyl acetate, citronellal, 3,4-dimethoxybenzaldehyde, terpineol, β-phenylethyl alcohol, isoamyl propionate, ethyl propionate, benzyl alcohol, maltol and the like. The amounts of these functional additives are, when practicality is taken into consideration and when they are expressed by weight percentage, several % to several tens %, preferably not more than 30%, for example, in the case of a polyhydric alcohol; are not more than several %, preferably not more than 2%, in the case of water-soluble polysaccharides or water-soluble polymers; and are not more than 1%, preferably not more than 0.1%, in the case of water-soluble perfumes. At these concentrations, sufficient transmittance and sufficient addition effect are obtained.

Moreover, by mixing, in addition to the above functional additives, for example, functional additives such as oil type compounds, humectants, surface active agents, metal oxides, ultraviolet screeners, inorganic salts, metal powders, gums, dyes, pigments, carbon black, silica compounds, latexes such as styrene-butadiene latex, acrylic latex and the like, emulsions, amino acids, antiseptic agents, crude drugs and the like, there can be prepared compounds in various states such as those in the colloidal state, those in the emulsion state, those in the cream state, those in the foam state and the like.

For example, the dispersion of the present invention has a high dispersion stability to inorganic particulates such as titanium oxide and silica, while it is also endowed with an excellent emulsion stability to oils. By adding the inorganic particulates to the cellulose dispersion of the present invention and mixing them, the dispersion can be allowed to have an ultraviolet screening effect, a photocatalytic effect and the like. Since many oils can be dispersed and stabilized without using surface active agents nor emulsifying agents, simplification of compounding components and the provision of compounds free from sticky feel are made possible. Also, the co-existence with various surface active agents and emulsifiers is possible. In addition, the miscibility with an antiseptic agent such as paraben (propyl parahydroxybenzoate) or the like is good. Further, there can be provided a highly transparent compound with a dye or pigment which requires a good color developability.

Of these functional additives, those having a higher boiling point than that of the dispersing medium according to the present invention have such advantages that after the addition thereof, the dispersing medium including water, an alcohol or the like can be removed from the resulting composite cellulose dispersion by a means such as vacuum drying method or the like. This procedure is preferred when it is desired to increase the content of the functional compound in the composite cellulose dispersion. Moreover, the cellulose dispersion and composite cellulose dispersion of the present invention can be formed into a transparent film by coating the same on a glass substrate or a paper or formed into a film by cast-coating the same on a teflon-coated ferro-plate. However, even when it is desired to allow such a functional additive to remain in the coating film or the film in the above cases after the evaporation of the dispersing medium, the use of the dispersing agent having a higher boiling point is convenient.

These composite cellulose dispersions, as explained in detail hereinafter, can be suitably prepared by a high-power grinding treatment (mixing action in this case) technique. When subjected to the high-power grinding treatment, it becomes the composite cellulose dispersion of the present invention which is more uniform and higher in transparency.

When the cellulose dispersion of the present invention exhibits a transmittance as high as not less than 80%, it is suggested that the cellulose in the dispersion is finely divided to a level of the wavelength of visible light or a shorter wavelength level. The whiteness of the cellulose dispersion depends upon the irregular reflection caused by the density difference between microcrystal and amorphous in the solid structure of the primary particle interior; however, in the cellulose dispersion of the present invention, it is inferred that the crystallizability of a cellulose being low suppresses remarkably the increase of the whiteness.

Moreover, the dispersion of the present invention has a high viscosity when allowed to stand or under a low shear stress; however, such a phenomenon that the viscosity is lowered under a high shear stress is noticeable and it is also characterized in that the so-called thixotropic properties are excellent.

Furthermore, almost all of the existing cellulose dispersions cause a separation from the dispersing medium (accompanied by water-separation phenomenon) at a pH of not more than 3 and its function as an additive is markedly impaired. On the other hand, the dispersion of the present invention does not cause water separation at all in a pH range of 2 to 3 and, in addition, the degree of water separation is slight even at a pH of about 1 as compared with the existing dispersions. That is to say, the dispersion of the present invention is endowed with an excellent dispersion stability which can be used in a wider pH range than the existing dispersions.

The dispersing medium in the dispersion of the present invention is usually water; however, depending upon the purpose, an alcohol such as methanol, ethanol, propanol or the like may be used. There may be also used the dispersion in which a part or the whole of the above dispersing medium has been replaced with an organic solvent such as acetone, acetonitrile, dimethyl sulfoxide, dimethylformamide, dimethylacetamide or the like or the dispersion in which a part or the whole of the above dispersing medium has been replaced with a mixed solvent of them. When a hydrophobic, organic solvent, for example, a hydrocarbon such as toluene, xylene or the like; an ester such as vinyl acetate or the like; or the like is used, the dispersing medium which is water, an alcohol or the like is replaced with an organic solvent such as acetonitrile or the like which is water-soluble and also soluble in a hydrophobic, organic medium in the stage that the inorganic acid used in the production process has been removed, and thereafter, the above organic medium is further replaced with a hydrophobic, organic solvent, whereby a dispersion is obtained. A deterioration of transparency is unavoidable, but may be tolerated.

Moreover, as mentioned above, a dispersion having a high transparency and a transmittance of not less than 80% is suitably obtained by further subjecting the above cellulose dispersion to high-power grinding treatment. The high-power grinding treatment in the present invention means an operation of highly mixing and finely dividing the sample by a high-power ultrasonic wave generator, a beads milling apparatus, a high pressure and ultrahigh pressure homogenizer or the like.

When the functional additive of the present invention mentioned hereinafter is further added to the composite cellulose dispersion, an application of the dispersion of the present invention in a wider range becomes possible.

Next, the process for producing a dispersion of the present invention is explained.

The cellulose dispersion of the present invention is obtained by a production process which comprises reprecipitating a cellulose solution in which a cellulose is dissolved in an aqueous inorganic acid solution (the cellulose solution is referred to hereinafter as the cellulose dope) in water or a coagulating agent containing not less than 50% by weight of water to prepare a cellulose suspension, subsequently subjecting the cellulose in the suspension to acid hydrolysis treatment, and then removing the acid from the suspension.

Furthermore, it can also be produced by preparing, after the precipitation, a dehydration cake of the cellulose, subsequently introducing the dehydration cake into water at not less than 50° C. and then subjecting the cellulose to acid hydrolysis treatment. As the aqueous inorganic acid solution in which the cellulose is to be dissolved, there are generally mentioned aqueous solutions such as not less than about 60% by weight sulfuric acid, not less than 75% by weight phosphoric acid, not less than 60% by weight nitric acid, not less than 40% by weight hydrochloric acid and the like, and of them, the aqueous sulfuric acid is preferred. The concentration of the aqueous inorganic acid solution necessary for dissolving cellulose is varied depending upon the kind of the cellulose or the dissolution temperature. In the case of, for example, an aqueous sulfuric acid solution, the regenerated cellulose is dissolved in about 58% by weight aqueous sulfuric acid solution at −10 to 30° C.; however, in the case of a natural cellulose, not less than about 60% by weight aqueous sulfuric acid solution is necessary. With any aqueous inorganic acid solution, when the treatment temperature is too high, hydrolysis action is preferential to dissolution action, so that the dissolution temperature is preferably not more than 30° C. When the dissolution temperature is too high, the lowering of the degree of polymerization by hydrolysis is violent and it becomes impossible to obtain a viscous solution characteristic of a high polymer solution. From the cellulose dope of too low a viscosity, it is difficult to obtain a suspension of a flocculate (floc) which is easy to recover in the subsequent reprecipitation step, so that it is not desirable. The viscosity of the cellulose dope is preferably about 100 to 3,000 poises. In practice, in order to obtain the cellulose dope suitable to the present invention using a cellulose having a DP of not less than 500, it is desirable to cause appropriately hydrolysis in the course of dissolution to lead the viscosity to the above-mentioned desired one. For example, for producing an aqueous sulfuric acid cellulose dope having a viscosity in this range, the dissolution temperature is more preferably not more than 20° C., particularly preferably not more than 10° C.

The cellulose used in this invention may fundamentally be a cellulosic substance containing an impurity such as wood or the like; however, a high purity cellulose which is easily available in industry is suitable and reasonable. There are, for example, cotton lint, cotton linter, purified pulp and the like. It may also a tunicin cellulose, a bacteria cellulose or the like. Also, a regenerated cellulose may be used. The cellulose concentration in the cellulose dope is generally 2 to 10% by weight.

Subsequently, the cellulose dope is reprecipitated in water or a coagulating agent containing not less than 50% by weight of water to form a suspension and deposit cellulose pieces in the form of floc.

The reprecipitation of the dissolved dope may be effected 1) by a method in which the dope is introduced into the preset amount of a coagulating agent, or 2) by a method in which the present amount of a coagulating agent is introduced into the dope, under a proper stirring condition. More preferably, there is recommended 3) a method in which the dissolved dope and a coagulating agent are contacted and reprecipitated in the steady state at a constant temperature in an apparatus having a mixing function by which the dissolved dope and the coagulating agent can be fed in certain amounts. For obtaining a dispersion having a high transparency and for depositing large cellulose pieces which are favorable to the subsequent purification step, the reprecipitation treatment is effected at a temperature as low as possible, preferably at not more than 30° C.

As the coagulating agent in the present invention, there is suitably used water or a mixture of water with not more than 50% by weight of a water-soluble alcohol. The selection of the coagulating agent depends upon the cellulose concentration, viscosity and the like of the final dispersion of the present invention and cannot be limited; however, when the coagulating agent is, for example, methanol, ethanol and isopropanol, the amount thereof is not more than 50% by weight, preferably not more than 30% by weight.

The ratio of the cellulose dope to the coagulating agent should be determined taking into consideration the performance of the dispersion and the recovery yield of cellulose; however, generally, cellulose pieces can be obtained in a high yield by use of the coagulating agent in an amount not less than two times the weight of the cellulose dope.

This suspension is subsequently subjected to acid hydrolysis treatment. In this case, the suspension may be warmed as it is to undergo acid hydrolysis, or the dehydrated cake obtained by filtering off the cellulose in the form of floc in the suspension may be introduced into water at not less than 50° C. and then subjected to acid hydrolysis. In the latter method, the production conditions can be set variously because the inorganic acid used as the solvent can be replaced with another inorganic acid or an organic acid and the reprecipitation conditions and the hydrolysis conditions can be widely selected. In any of the above methods, it is necessary to adjust the acid concentration to the desired one.

In the acid hydrolysis step, the cellulose of the present invention is made lower in degree of polymerization and more finely divided.

The acid used in the hydrolysis in the present invention includes inorganic acids such as sulfuric acid, hydrochloric acid, phosphoric acid and the like and organic acids such as acetic acid, mono- or dichloroacetic acid, trifluoroacetic acid and the like; however, sulfuric acid and hydrochloric acid are preferable, and sulfuric acid is particularly preferable.

The acid concentration suitable for the hydrolysis should be determined in the even balance between the kind of the acid and the hydrolysis temperature; however, when the temperature is not less than 50° C., the acid concentration is preferably not more than 30% by weight but not less than 3% by weight. In this range, the cellulose-recovering efficiency is high and the purification is easy. The hydrolysis temperature is generally 50 to 100° C., preferably 70 to 95° C., and the reaction time is about 5 to 180 minutes, preferably 10 to 120 minutes. At a temperature exceeding 100° C., coloration of cellulose due to side reaction tends to be caused, so that said temperature is not desired. At a temperature of less than 50° C., it is difficult to obtain the cellulose defined in the present invention and the hydrolysis time becomes a long time exceeding 180 minutes, which is not applicable to industry, and hence, it is not desirable.

The appearance of the cellulose floc in the suspension which has been hydrolyzed by the above-mentioned process of the present invention maintains fundamentally the shape of coarse particle formed during the reprecipitation.

The cellulose in the suspension after the hydrolysis is subjected to removal of acid until the pH of the washings become not less than 2, preferably not less than 4 by repeating washing and solvent-removal with water or a water-soluble alcohol or a mixture of the two. For adjusting the pH of the washings during the preparation of the dehydrated cake to not less than 2, washing and solvent-removal with a dilute aqueous solution containing an alkaline material, a mixture of water and an alcohol, or the like is preferred.

In order to remove the acid to increase the cellulose concentration (condense), a method such as filtration, centrifugation, pressing or the like is generally used. It is effective to combine these methods. In this stage, replacement with other dispersing media may be made.

The cellulose concentration in the dehydrated cake is usually 5 to 10% by weight.

The dispersion of the present invention is obtained by subjecting to kneading or granulation the dehydrated cake after the acid removal as it is or after a dispersing medium is added so that the cellulose concentration becomes the desired one, by means of a kneading apparatus such as a kneader, a homogenizer, a blender or the like.

The dispersion of the present invention having a transmittance of not less than 80% is obtained by further highly pulverizing the above-mentioned dispersion of the present invention by a means such as a solvent pulverization method, a pressure grinding method or the like.

For the high-power grinding treatment with, for example, a homogenizer, there is recommended the use of a ultrahigh pressure homogenizer by which an operation pressure of not less than 700 kgf/cm$^2$ can be used. When the high-power grinding treatment is repeatedly effected, the dispersion of the present invention having a transmittance of not less than 80% is obtained.

The dispersion of the present invention can be suitably produced when sulfuric acid is used as an inorganic acid for dissolving the starting cellulose therein and as an acid for hydrolysis. In the present invention, a 58 to 75% by weight aqueous sulfuric acid solution is preferable in respect of the solubility of the cellulose and the like. It is favorable to prepare a cellulose suspension composed of a 5 to 30% by weight aqueous sulfuric acid solution by reprecipitating the cellulose dope of a concentrated sulfuric acid solution cooled to not more than 20° C. with water or a coagulating agent containing not less than 50% of water. The hydrolysis reaction depends upon the sulfuric acid concentration, the reaction temperature and the reaction time. In the present invention, a sulfuric acid concentration of 5 to 30% by weight, a reaction temperature of 50 to 100° C. and a reaction time of 10 to 180 minutes are used as the general hydrolysis conditions. Even in the case of a production process in which the suspension is first filtered to prepare a dehydrated cake, and then this dehydrated cake is introduced into water at 50° C. to be hydrolyzed, which process is another mode of the production process of the present invention, the hydrolysis conditions may be fundamentally in accordance with the above-mentioned conditions. It is preferable to subsequently conduct washing and dehydration to remove the sulfuric acid so that the pH of the washings of the dehydrated cake becomes not less than 2, preferably not less than 4, and thereafter, if necessary, neutralize the dehydrated cake with dilute ammonia water, a dilute aqueous sodium hydroxide solution or the like and further washing the same with the above dispersing medium. The dehydrated cake is diluted to the desired cellulose concentration and granulated to form the dispersion of the present invention. The dispersion of the present invention having a transmittance of not less than 80% is obtained by effecting the high-power grinding treatment according to the above-mentioned grinding method.

The dispersing medium for the dispersion of the present invention may be a mixture of water-soluble organic solvents with one another at any ratio or a mixture of water with a water-soluble organic solvent.

As the water-soluble organic solvents, there are mentioned methanol, ethanol, propanol, acetone, acetonitrile, dimethyl sulfoxide, dimethylformamide, dimethylacetamide and the like.

The replacement of the dispersion medium of the dispersion with a water-soluble organic solvent can be conducted by repeatedly washing the dehydrated cake with the organic solvent. Moreover, it can also be conducted by mixing water with a water-soluble organic solvent having a higher boiling point than water at any ratio and thereafter removing the water contained in the cellulose dispersion by a method such as heating or the like. For mixing the above water-soluble organic solvent, there are a method of mixing the organic solvent with the dehydrated cake in the middle stage of the initial solvent removal and a method of mixing the organic solvent with the dehydrated cake after completion of the solvent removal. The above-mentioned method using the water-soluble organic solvent having a higher boiling point than water enables water to be completely removed from the cellulose dispersion and is a preferable method.

By treating as mentioned above, in the dispersion of the present invention in which water is the dispersing medium, a part or the whole of the dispersing medium can be replaced with a water-soluble organic solvent other than water. When a composite cellulose dispersion is prepared by adding various functional additives, the selection of a dispersing medium composition having the highest affinity for the functional additive to be used becomes easy.

Moreover, in the present invention, there is also suitably used a process for producing a cellulose dispersion by mixing or substituting a water-soluble organic solvent at any ratio and thereafter conducting a high-power grinding treatment.

The composite cellulose dispersion of the present invention having a transmittance of not less than 40% can be produced by the same method as in the dispersion of the present invention in which a water-soluble organic solvent is mixed. That is to say, the dispersion is obtained by incorporating a functional additive at any ratio into a dispersion having a transmittance of not less than 40% prepared using a dispersing medium composition highest in affinity for the functional additive used and mixing them by a kneading apparatus such as a kneader, a homogenizer, a blender or the like. In the case of the composite cellulose dispersion having a transmittance of not less than 80%, it is favorable to mix the functional additive with the dispersion of the present invention having a transmittance of not less than 80% by the above-mentioned method.

The composite cellulose dispersion of the present invention can be converted into a composite cellulose dispersion more uniform and higher in transparency by subjecting the former to high-power grinding treatment.

From the cellulose dispersion and composite cellulose dispersion of the present invention mentioned above, there can be obtained, respectively, cellulose particulates and cellulose composite particulates by a spray drying method.

An explanation is made below of the cellulose particulate and the cellulose composite particulate.

The cellulose particulate is composed of a low crystalline cellulose having a fraction of cellulose I type crystal component of not more than 0.1 and a fraction of cellulose II type crystal component of not more than 0.4, preferably not more than 0.3. Moreover, it is characterized by consisting of a cellulose having an average degree of polymerization (DP) of not more than 100.

The average particle diameter of the cellulose particulate of the present invention is 0.2 to 20 $\mu$m, preferably 0.2 to 10 $\mu$m. Cellulose particulates having a particle diameter exceeding 20 $\mu$m can be produced, but it is difficult to obtain a particulate free from rough feel and rich in rolling properties aimed at by the present invention. Cellulose particulates having a particle diameter of less than 0.2 $\mu$m can also be produced, but are not desirable because the particle-gathering efficiency during the production is extremely lowered.

The cellulose particulate of the present invention is very high in degree of true sphericity and the L/D value thereof is not more than 1.2. This requirement can be satisfied by use of the dispersion of the present invention having a cellulose concentration which exhibits liquid properties. However, even at a cellulose concentration at which the above dispersion is gel-like, the dispersion of the present invention has a thixotropic properties and is in a liquid state in which the viscosity is low when sprayed in the spray-drying, and hence, can be preferably used. As the dispersing medium, it is desirable to use water which has a high surface tension and whose droplet has a high sphere-forming power or a system rich in water. This also applies to the production of the cellulose composite particulate.

When the L/D value exceeds 1.2, the rolling properties as powder are deteriorated, and a rough feel is developed, so that it is not desirable. In the cellulose particulate of the present invention, the L/D value can be held to approximately 1.0. The L/D value of the cellulose particulate of the present invention tends to become higher when the particulate is prepared from the dispersion of the present invention having a transmittance of not less than 80% than when prepared from the dispersion having a transmittance of 40%.

The cellulose particulate of the present invention is low in aggregable properties and the coefficient of aggregation thereof is 1.0 to 3.0, preferably 1.0 to 1.8. When the coefficient of aggregation exceeds 3.0, the dispersibility of the cellulose composite particulate stated hereinafter is greatly deteriorated, and the characteristics of the spherical particulate of the present invention already mentioned are lost, so that said coefficient of aggregation is not desirable. When the coefficient of aggregation is not more than 1.8, the cellulose particulate of the present invention develops effectively the excellent characteristics of the particulate of the present invention, so that said coefficient of aggregation is more preferable.

Moreover, the cellulose particulate of the present invention is a particulate having so high a compression strength that even when pressed at a pressure of 100 kgf/cm², the particulate is neither fractured nor deformed. That is, it is characterized in that even after pressing, the L/D value of the particulate is not more than 1.2. The particulate disclosed in JP-A-5-100,268 and the like which is obtained by the phase separation method from a viscose solution is easily fractured and deformed by pressing stronger than the compression strength or by crushing. On the other hand, the cellulose particulate of the present invention is not deformed at a pressure of 100 kgf/cm², even at a pressure of 200 kgf/cm² in a suitable case.

A group of cellulose particulates obtained from a viscose solution by a phase separation method are porous even if dry spherical particulates are obtained, and the porous particulates are deformed (crushed) even at a pressure of about 50 kgf/cm² and do not have such a strength against compression that the cellulose particulate of the present invention has.

As mentioned above, the particulate of the present invention is characterized by low crystallizability, low degree of polymerization, very small particle diameter, high degree of true sphericity, low aggregable properties and high mechanical strength or hardness.

The cellulose particulate of the present invention is low in crystallizability and has a very small particle diameter, and a combination of the two makes it high in affinity for other components, namely high in adsorbability and biodegradability and also high in moisture retention. It has a water content of not less than 12% by weight. It has a moisture retention about two times that of the known crystallite cellulose (MCC). In addition, it is effectively employed in uses of coloration with a dye, a pigment or the like. Therefore, it can form a dampish, delicate coating layer. This feature is hardly replaced with the existing finely divided cellulose.

Moreover, the cellulose particulate of the present invention is amphipathic and has a high affinity for many water-soluble materials, metal oxides, oils, latexes and the like and also has a safety and biodegradability because it is derived from a natural material. Therefore, the particulate of the present invention is suitable as a rolling material in a composite system such as cosmetic foundation or the like, and is very easily dispersed in other compounding components.

Furthermore, the cellulose particulate of the present invention is characterized in that it is a material resulting from natural cellulose and is excellent in moisture retention and oleophilicity, and hence, is provided with a higher added value than the spherical, dust-size particle of the existing nylon 12 or polymethyl acrylate.

In addition, the cellulose particulate of the present invention has a high shapeability. Since some cosmetic foundation, ointment and the like are utilized after pressure molding or pressure packing, so that they are higher in utilization value than the above-mentioned synthetic polymer dust-size particles which are much poorer in shapeability than the cellulose particulate of the present invention.

An explanation is made below of the composite cellulose particulate of the present invention.

The cellulose composite particulate of the resent invention is a particulate in which at least one functional additive is contained and dispersed in the cellulose particulate of the present invention, the average particle diameter of the particulate is 0.2 to 20 μm, the ratio of long diameter (L) to short diameter (D) observed through a scanning electron microscope (L/D) is not more than 1.2, and the coefficient of aggregation is 1.0 to 3.0. Moreover, it is a particulate having so high a compression strength that even when pressed at a pressure of 100 kgf/cm², it is neither fractured nor deformed. The cellulose composite particulate of the present invention has the excellent function and effect based on the constitution of the cellulose particulate of the present invention in combination with the function of the functional additive added, and various functional additives are highly dispersed without being aggregated, and the persistence of effectiveness of the functional additive is high.

The functional additive to be used in the present invention is at least one member selected from the group consisting of an oil type compound, a water-soluble polymer, a humectant, a surface active agent, a metal oxide, an ultraviolet screener, an inorganic salt, a metal powder, a gum, a dye, a pigment, a fertilizer, carbon black, a silica compound, a latex, an emulsion, an aminoacid, a perfume, a crude drug and a antiseptic agent.

More particularly, it includes oil type compounds, for example, silicone oils such as methyl polysiloxane, silicone polyether copolymer and the like; vegetable oils such as olive oil, macadamia nut oil, castor oil and the like; animal oils; lanolin; liquid paraffin; squalane; water-soluble polymers, for example, cellulose derivatives such as CMC, MC, HEC, HPC and the like; humecants such as hyaluronic acid, glycerin, 1,3-butylene glycol, sorbitol, polypropylene glycol, dipropylene glycol, partially acetylated chitin, shifingo lipid and the like; surface active agents such as alkylsulfuric acid salts, alkyl ether sulfuric acid salts, N-acylglutamic acid salts, N-acylmethyltaurine, acylcollagen peptide, betaine acetate, sucrose fatty acid ester, polyglycerin fatty acid ester, sorbitan fatty acid ester, polyoxyethylene alkyl ether, alkyl glycoside, lecithin and the like; metal compounds such as titanium oxide, zinc oxide, zirconium oxide, iron oxide, aluminum oxide and the like; ultraviolet screeners such as urocanic acid, oxybenzone, phenyl salicylate, octyl salicylate, ethylhexyl paramethoxycinnamate, para-aminobenzoic acid, ethyl para-aminobenzoate, glyceryl para-aminobenzoate, amyl para-dimethylaminobenzoate, octyl para-dimethylaminobenzoate, dibenzoylmethane and the like; and latexes such as styrene-butadiene latex, acrylic latex and the like. The functional additives mentioned as to the above dispersion can also be used. In addition, the functional additives mentioned here can be used in the above-mentioned dispersion.

The cellulose particulate of the present invention is obtained by a production process which comprises granulating the cellulose dispersion and drying the same by a spray drying method. More specifically, a method in which the dispersion of the present invention is granulated by a spraying type or a disc type spray dryer having a dispersing function and dried can be recommended. In the spray drying method, the average particle diameter of the particulate is controlled by varying the cellulose concentration in the cellulose dispersion to be fed, the kind of the dispersing medium, the amount of the cellulose dispersion fed to the drying unit, the feeding pressure, the drying rate and the like.

The cellulose concentration of the dispersion of the present invention is preferably 1 to 4% by weight taking into consideration the flow properties during feeding the liquid and the heat exchange rate during drying. The dispersion whose cellulose concentration has been adjusted is fed to the pressure nozzle or disc cutter portion of the spray dryer by a liquid-feeding means such as a tube pump or the like and dispersed in the form of droplet, discharged into the drying portion, subjected therein to granulation and drying simultaneously, and subsequently led to the recovering portion to recover the particulates.

The inlet temperature in the drying portion is varied depending upon the cellulose concentration of the dispersion, the amount of the dispersion fed, the heat exchange rate in the drying portion and the like; however, in the case of the dispersion of the present invention, a temperature of 100 to 250° C., preferably about 120 to 200° C. is generally adopted. The outlet temperature had better be controlled so as not to exceed 100° C. In the case of the dispersion of the present invention which contains an organic solvent as the dispersing medium, taking into consideration the properties of the dispersing medium, particularly the boiling point thereof in the dispersion, it is preferable to adopt a temperature not less than about 20° C. higher than the boiling point of the dispersing medium. The amount of the dispersion fed is varied depending upon the cellulose concentration of the dispersion and the like; however, the above amount is generally about 10 to 40 ml/min when the particle diameter of the particulate obtained is 2 to 5 $\mu$m.

Since in the spray drying method, granulation and drying are effected simultaneously under such conditions that the dispersion dispersed in the form of droplet can be dried in a moment, a spherical particulate having a dense internal structure is easily obtained. The particulate obtained from the dispersion of the present invention by the above-mentioned spray drying method has a large compression strength.

Even if a dry particulate is produced by a spray drying method using MCC or MFC as the starting material, the spherical particulate of the present invention which has an average particle diameter of 0.2 to 20 $\mu$m and an L/D value of not more than 1.2 is not obtained. The basic units of MCC and MFC are particles high in shape-anisotropy such as bar-like particle, rigid fibril and the like, so that even by the spray drying method, the particles cannot be said to be spherical though the L/D value becomes relatively small (L/D is at best about 2.0). Moreover, the particle has a large average degree of polymerization and a high crystallinity and is different from the particulate of the present invention.

Next, an explanation is made of the process for producing the cellulose composite particulate of the present invention.

The cellulose composite particulate of the present invention is obtained by mixing the cellulose dispersion of the present invention with at least one functional additive, granulating and drying the resulting mixed liquid by a spray drying method similarly to the above-mentioned particulate of the present invention.

The composite dispersion which is a precursor of the composite particulate of the present invention is obtained by mixing and dispersing the functional additive in the dispersion of the present invention which has the adjusted cellulose concentration, by a homogenizer, a blender or another kneading machine, and more preferably, and if possible, by mixing and dispersing them by a high-power grinding treatment in a high pressure or ultrahigh pressure homogenizer. The mixing ratio of the functional additive to be mixed and dispersed is not more than 50% by weight, preferably not more than 30% by weight based on the cellulose. The cellulose composite particulate of the present invention is a particulate having, in combination, both the characteristics of the cellulose particulate of the present invention and the characteristics of the functional additive compounded.

The dispersion and particulate which the present invention provides are of a cellulose material which has a very much higher dispersion stabilizing action on suspension, dispersion, emulsion or the like than the conventional products and can be utilized in a wide industrial field as a thickening agent, a shape-imparting agent, a cloudy agent, a sizing agent, a fat-and-oil substitute, a structural material or the like which have a higher effect.

Furthermore, the cellulose dispersion and composite cellulose dispersion of the present invention can form a transparent coating film by coating on the surface of an inorganic material substrate, a plastic substrate, a paper or the like. As the inorganic material substrate, there are mentioned glass substrates, metal oxide substrates, carbonaceous material substrates and the like. It is also possible to form a transparent cellulose film by cast-coating the above dispersion on a teflon-coated ferro-plate and drying and peeling the resulting film.

The present invention is explained below in more detail by Examples. Incidentally, as the numeral values of physical properties of the dispersions shown in the present Examples, there were adopted, unless otherwise specified, values determined by the measurement methods defined in the present invention. For example, the average particle diameter of the cellulose in a suspension was evaluated, unless otherwise specified, by the method of the measurement of "the average particle diameter of constitutive cellulose" stated above. Moreover, the transmittance of dispersion means the transmittance of the dispersion when the cellulose concentration was adjusted to 0.05% by weight according to the method stated in the present invention.

In the following Examples and Comparative Examples, % for expressing the composition components means % by weight unless otherwise specified.

EXAMPLE 1

A wood pulp having a degree of polymerization of 760 obtained by cutting a pulp sheet to chips having a size of 5 mm×5 mm (referred to hereinafter as merely the wood pulp) was dissolved in a 65% aqueous sulfuric acid solution at −5° C. under the stirring conditions of 150 rpm for 10 minutes so that the cellulose concentration became 5% to obtain a cellulose dope. The dope was transparent and uniform and dissolution spots were not observed. This cellulose dope was poured with stirring into water (5° C.) in an amount about 2.5 times the weight of the dope to aggregate the cellulose in the form of a floc, thereby obtaining a suspension. This suspension was subjected to hydrolysis at 85° C. for 20 minutes and then repeatedly subjected to sufficient washing and vacuum dehydration until the pH of the washings became not less than 4 to obtain a white, transparent, gel-like product having a cellulose concentration of about 6%. This gel-like product was subjected to mixing and homogenizing treatment by a domestic food processor (knife cutter) for 3 minutes and the sample thus obtained was referred to hereinafter as the S1 sample.

The cellulose of the S1 sample had an average degree of polymerization of 38, such a crystallinity that $x_I$ was 0 and $x_{II}$ was 0.28 and an average particle diameter of 2.3 $\mu$m, and the transmittance of the dispersion was 56%.

In the subsequent Examples, unless otherwise specified, as in the present Example, the starting cellulose solid was cut to chips, stirred sufficiently in the given inorganic acid until undissolved component became substantially nil to prepare a cellulose dope.

EXAMPLE 2

A preparation example of the present invention in which the transmittance is not less than 80% is shown.

The S1 sample obtained in Example 1 was diluted with water to a cellulose concentration of 2% and then subjected to mixing in a blender at a revolution rate of 15,000 rpm for 5 minutes. Subsequently, this S1 sample after the dilution was treated in an ultrahigh pressure homogenizer (Microfluidizer Model M-110EH manufactured by Mizuho Kogyo Kabushiki Kaisha, operation pressure: 1,750 kg/cm$^2$) to obtain two gel-like samples, which were a sample treated once (1 Pass) and a sample treated 4 times (4 Pass). The sample treated once is referred to hereinafter as the S2A sample and the sample treated 4 times as the S2B sample.

The cellulose of the S2A sample had an average degree of polymerization of 38, such a crystallinity that $x_I$ was 0 and $x_{II}$ was 0.28 and an average particle diameter of 0.86 μm, and the transmittance of the dispersion was 74%.

The cellulose of the S2B sample was such that the average degree of polymerization was 38, the crystallinity was $x_I$ of 0 and $x_{II}$ of 0.28, the average particle diameter was 0.18 μm, and a transmittance of dispersion of 95%.

Particularly, the S2B sample had the properties of a gel like agar though it was a water dispersion having a cellulose concentration of 2%.

EXAMPLE 3

Two samples were obtained, one of which was prepared by subjecting the S1 sample obtained in Example 1 to five repetitions of mixing, centrifugation and decantation using ethanol, and the other sample was obtained by subjecting the S1 sample to the same procedure as above using acetone. At this time, the cellulose concentration in the ethanol substitution product at this time was 7% and the cellulose concentration of the acetone substitution product was 6%. Further, these samples were diluted with the respective dispersing media so that each of the cellulose concentrations became 3% and then subjected to granulating treatment in a blender at a revolution rate of 15,000 rpm for 10 minute to finally obtain two samples. The ethanol substitution product thus obtained is referred to hereinafter as the S3A sample and the acetone substitution product thus obtained as the S3B sample. In each of the S3A sample and the S3B sample, the cellulose thereof had an average degree of polymerization of 38 and such a crystallinity that $x_I$ was 0 and $x_{II}$ was 0.28, and the average particle diameters of the samples were, respectively, 3.5 μm (S3A) and 3.9 μm (S3B). The transmittance of the dispersion of the S3A sample was 52% and that of the S3B sample was 43%. Each of the samples was a white, semitransparent, viscous dispersion.

EXAMPLE 4

The S1 sample obtained in Example 1 was diluted with a water/ethanol mixture so that the cellulose concentration in the dispersion became 1% and the composition of the dispersing medium became 50% by volume of water and 50% by volume of ethanol, and thereafter, subjected to mixing treatment in a blender at a revolution rate of 15,000 rpm for 5 minutes. Further, this mixture was subjected 4 times to ultrahigh pressure homogenizer treatment in the same manner as in Example 2 to obtain a viscous dispersion. This dispersion is referred to hereinafter as the S4A sample. Subsequently, ethanol and water were added to the water dispersion S2B high in transparency obtained in Example 2 which had been subjected to ultrahigh pressure homogenizer treatment so that the cellulose concentration in the dispersion became 1% and the composition of the dispersion medium became 50% by volume of water and 50% by volume of ethanol, and thereafter, they were subjected to mixing treatment in a blender at a revolution rate of 15,000 rpm for 5 minutes. This dispersion is referred to hereinafter as the S4B sample.

The cellulose of the S4A sample had an average degree of polymerization of 38, such a crystallinity that $x_I$ was 0 and $x_{II}$ was 0.28 and an average particle diameter of 0.56 μm, and the transmittance of the dispersion was 96%. The S4A sample had the properties of a gel. The cellulose of the S4B sample had an average degree of polymerization of 38, such a crystallinity that $X_I$ was 0 and $x_{II}$ was 0.28, an average particle diameter of 2.6 μm, and a transmittance of dispersion of 71%. The S4B sample was a heterogeneous, gel-like dispersion which was transparent but had somewhat a rough feel. In respect of the uniformity and transparency of the dispersion, there was very effective a method in which in the addition of an organic solvent as the dispersing medium, an appropriate amount of the organic solvent was first added to the dispersion of the present invention, then they were well mixed and thereafter the mixture was subjected to high-power grinding treatment. The S4A sample was more suitable as, for example, a coating agent for the hydrophobic surface.

EXAMPLE 5

The S3B sample obtained in Example 3 was diluted with acetone so that the cellulose concentration became 1%, and thereafter, subjected to mixing treatment in a blender at a revolution rate of 15,000 rpm for 5 minutes. Further, this mixture was subjected 4 times to ultrahigh pressure homogenizer treatment in the same manner as in Example 2 to obtain a viscous dispersion. This dispersion is referred to hereinafter as the S5 sample. The cellulose of the S5 sample had an average degree of polymerization of 38, such a crystallinity that $x_I$ was 0 and $x_{II}$ was 0.28 and an average particle diameter or 1.2 μm, and the transmittance of the dispersion was 87%. The S5 sample was a dispersion having flow properties.

EXAMPLE 6

Simultaneously with diluting the S1 sample of the Example 1 with water, a previously prepared 2% aqueous solution of hydroxyethyl cellulose (HEC; manufactured by Tokyo Kasei Kogyo Kabushiki Kaisha, 4,500 to 6,500 cps (2% aqueous solution, 25° C.)) was added thereto to prepare a composite cellulose dispersion having a cellulose concentration of 1.0% and an HEC concentration of 1.0%, and thereafter, this was subjected to treatment in a blender at a revolution rate of 15,000 rpm for 3 minutes, and further subjected once to high-power grinding treatment in an ultrahigh pressure homogenizer in the same manner as in Example 2. A composite cellulose dispersion of a highly transparent, uniform, very highly viscous, gel-like substance was obtained. This sample is referred to hereinafter as the S6A sample. The transmittance of the dispersion of the S6A sample was 87%.

Subsequently, the S1 sample obtained in Example 1 was diluted with a water/ethanol mixture so that the cellulose concentration in the dispersion became 1% and the composition of the dispersing medium became 50% by volume of water and 50% by volume of ethanol, and to this mixture was added an acrylic latex having a solid content of 46.1% (Grade E-315 manufactured by ASAHI CHEMICAL INDUSTRY CO., LTD., average particle diameter: 0.3 $\mu$m) so that the latex concentration became equal to the cellulose concentration (latex concentration=cellulose concentration≈1%), and thereafter, the mixture was subjected to mixing treatment in a blender at a revolution rate of 15,000 rpm for 5 minutes and then subjected 3 times to high-power grinding treatment in an ultrahigh pressure homogenizer in the same manner as in Example 2. A transparent, uniform and highly viscous composite cellulose dispersion was obtained. This sample is referred to hereinafter as S6B. The transmittance of the dispersion of the S6B sample was 84%.

The S6B sample was effective as a coating agent for the purpose of making the surface of a hydrophobic aqueous polymer material hydrophilic.

COMPARATIVE EXAMPLE 1

0.05% water dispersions of four commercially available finely divided celluloses (three MCCs having differnt particle diameters (average particle diameter: about 50 $\mu$m, about 20 $\mu$m and about 5 $\mu$m) and one MFC (average particle diameter; 100 $\mu$m )) were prepared. In this order, they are referred to hereinafter as the R1A sample, the R1B sample, the R1C sample and the R1D sample. Subsequently, commercially available rayon filament and cupra filament (cellulose/cuprammonium solution-derived filament) were finely cut to a length of about 1 mm and the resultants were hydrolyzed in a 30% aqueous sulfuric acid solution at 80° C. for 2 hours and then sufficiently washed with water so that the pH became not less than 4, and then dehydrated to obtain water dispersions having cellulose concentrations of 14% and 17%, respectively. The average particle diameters in these dispersions were such that the treated product of rayon long filament was 4.6 $\mu$m and the treated product of cuprammonium rayon long filament was 6.8 $\mu$m. 0.05% water dispersions of these two dispersions were prepared and are referred hereinafter as the R1E sample and the R1F sample, respectively.

Incidentally, the preparation of the dispersion sample was effected by mixing in a blender at a revolution rate of 15,000 rpm for 3 minutes and thereafter subjecting to ultrasonic treatment for 10 minutes.

Of these 6 samples, MMC having an average particle diameter of not less than 20 $\mu$m (the R1A and R1B samples) was substantially unable to be subjected to measurement of transmittance because the cellulose settled immediately. Moreover, in R1A and R1B, white turbid particles were clearly observed visually.

The transmittances of the R1C, R1D, R1E and R1F samples were 30, 27, 23 and 45%, respectively. As to the crystallinity of particle, in all of R1A, R1B and R1C, $x_I$ was in the range of 0.63 to 0.65 and $x_{II}$ was 0, and in R1D and R1E, $x_I$ was 0 in both cases and $x_{II}$ was 0.52 in R1D or 0.57 in R1E. The R1C, R1D and R1E samples are low in transmittance and different from the present invention. The R1F sample has a transmittance within the range of the present invention but is high in crystallinity and large in particle diameter, and hence, is different from the present invention.

EXAMPLE 7

Wood pulp having a degree of polymerization of 760 was dissolved in a 65% aqueous sulfuric acid solution at −5° C. under the stirring condition of 50 rpm for 5 minutes so that the cellulose concentration became 5% to obtain a cellulose dope. The cellulose dope obtained under these conditions was transparent but observed so that dissolution spots were slightly left. This dope was poured with stirring into water (5° C.) in an amount 2.5 times the weight of the dope to aggregate the cellulose in the form of floc, thereby obtaining a suspension. This suspension was subjected to hydrolysis at 85° C. for 20 minutes and then subjected sufficiently to repetition of water-washing and vacuum dehydration until the pH of the washing became not less than 4 to obtain a white and transparent, gel-like product having a cellulose concentration of about 6%. A sample obtained by subjecting this gel-like product to mixing and uniformizing treatment by a domestic food processor (knife cutter) for 3 minutes is referred to hereinafter as the S7A sample. The cellulose of the S7A sample had an average degree of polymerization (DP) of 42 and such a crystallinity that $x_I$ was 0.06 and $x_{II}$ was 0.15, and an average particle diameter of 2.7 $\mu$m, and the transmittance of the dispersion was 51%. From the fact that the value of $x_I$ of the S7A sample was not 0, it is inferred that in the course of dissolution of wood pulp, undissolved components existed microscopically though the dope was visually nearly transparent.

Subsequently, the S7A sample obtained was diluted with water to adjust the cellulose concentration to 2%, and subjected to stirring treatment in a blender under the condition of 15,000 rpm for 5 minutes. Thereafter, the sample was subjected 4 times to ultrahigh pressure homogenizer treatment in the same manner as in Example 2 to obtain a gel-like product high in transparency. This sample is referred to hereinafter as S7B.

The cellulose of the S7B sample had an average degree of polymerization of 42, such a crystallinity that $x_I$ was 0.06 and $x_{II}$ was 0.15, and an average particle diameter of 0.21 $\mu$m, and the transmittance of the dispersion was 90%.

EXAMPLE 8

Wood pulp having a degree of polymerization of 760 was dissolved in a 65% aqueous sulfuric acid solution at -5° C. so that the cellulose concentration became 5%. This solution was poured into water in an amount 2.5 times the weight of the solution with stirring to aggregate the cellulose in the form of floc, thereby obtaining a suspension. This suspension was subjected as it was to hydrolysis at 80° C. for a period of 0.5, 1, 2 or 3 hours, and subsequently sufficiently washed with water until the pH of the washings became not less than 4 and then dehydration-concentrated to obtain a white and transparent gel-like product having a cellulose concentration of about 5 to 7%. This gel-like product was treated by a domestic food processor (knife cutter) for 3 minutes to obtain four samples. The samples in which the hydrolysis times were 0.5, 1, 2 and 3 hours are referred to hereinafter as the S8A, S8B, S8C and S8D samples, respectively.

The degrees of polymerization of the S8A to S8D samples were 54 (S8A), 38 (S8B), 34 (S8C) and 29 (S8D), their crystallinities were such that $x_I$ was 0 in all the samples and $x_{II}$ was 0.16 (S8A), 0.28 (S8B), 0.32 (S8C) or 0.35 (S8D), their average particle diameters were 4.2 (S8A), 2.1 (S8B), 1.3 (S8C) and 0.86 (S8D), and their transmittances of dispersions were 48% (S8A), 53% (S8B), 70% (S8C) and 88% (S8D).

EXAMPLE 9

Wood pulp having a degree of polymerization of 760 was dissolved in a 65% aqueous sulfuric acid solution at −5° C. so that the cellulose concentration became 5%. This solution was poured with stirring into water in an amount 1.25, 2.5 or 5.0 times the weight of the solution to obtain suspensions in which the cellulose was aggregated in the form of floc. Each of the suspensions was subjected as it was to hydrolysis at 80° C. for 1 hour and then sufficiently washed with water until the pH of the washings became not less than 4 and hereafter dehydration-concentrated to obtain white and transparent gel-like products having a cellulose concentration of about 5 to 7%. The gel-like products were treated by a domestic food processor (knife cutter) for 3 minutes to obtain three samples. The final products obtained by subjecting the samples to reprecipitation from water in amounts of 1.25, 2.5 and 5.0 times the weights of the respective samples are referred to hereinafter as the S9A, S8B and S9B samples, respectively.

The degrees of polymerization of the cellulose of the S9A, S8B and S9B samples were 26 (S9A), 38 (S8B) and 76 (S9B), their crystallinities were such that $x_I$ was 0 in all the samples and $x_{II}$ was 0.10 (S9A), 0.28 (S8B) and 0.32 (S9B), their average particle diameters were 0.95 (S9A), 2.1 (S8B) and 4.8 (S9B), and their transmittances of dispersion were 72% (S9A), 53% (S8B) and 42% (S9B).

COMPARATIVE EXAMPLE 2

Wood pulp having a degree of polymerization of 760 was dispersed in a 4% aqueous hydrochloric acid solution and hydrolyzed at 80° C. for 30 minutes. The aqueous hydrochloric acid suspension of the hydrolyzate obtained was sufficiently washed with water until the pH of the washings became not less than 4. Water was added to the thus obtained cake-like product having a cellulose concentration of 50% so that the cellulose concentration became 4% and they were mixed to prepare a slurry. This slurry was poured at a flow rate of 0.69 liter/min into a medium-stirring wet type grinding apparatus (Pearl Mill™ manufactured by Ashizawa Kabushiki Kaisha) having an internal volume of 2 liters and a medium-filling percentage of 80% and subjected to treatment 5 times in total. By this process, an opaque, milk white, cream-like suspension was obtained. The suspension obtained is referred to hereinafter as R2A. This suspension was diluted with water until the cellulose concentration became 2% and subjected 4 times to ultrahigh pressure homogenizer treatment in the same manner as in Example 2. The suspension obtained is referred to hereinafter as R2B. The particle in each of the R2A and R2B samples had an average degree of polymerization of 120 and such a crystallinity that $x_I$ was 0.66 and $x_{II}$ was 0, and the average particle diameter was 2.8 μm (R2A) or 0.86 μm (R2B) and the transmittance of dispersion was 21% (R2A) or 28% (R2B). Both the samples had properties like those of a white cream. In particular, the particle of the R2B sample had a very small particle diameter but a high crystallizability, and did not exhibit such a high transparency as in the dispersion of the present invention.

COMPARATIVE EXAMPLE 3

Wood pulp having a degree of polymerization of 760 was dispersed in a 65% aqueous sulfuric acid solution at 30° C. so that the cellulose concentration became 1%, and this dispersion was subjected to hydrolysis at 70° C. for 10 minutes, after which this was mixed with water in an amount 10 times the weight of the dispersion. The mixture was subjected to centrifugation at a revolution rate of 15,000 rpm for 20 minutes. The supernatant was removed leaving only the white precipitate in the centrifugal precipitation tube, and water was mixed with and dispersed in this white precipitate in an amount 10 times the weight of the precipitate, after which they were subjected to centrifugation again at a revolution rate of 15,000 rpm for 20 minutes. The centrifugation, decantation and water-mixing steps were repeated until the pH of the supernatant became not less than 3, and the suspension obtained was subjected to dialysis treatment to be made nearer to neutrality. Finally, there was obtained a white but somewhat transparent, free-flowing suspension having a cellulose concentration of 1% and a pH of 4.5. This suspension is referred to hereinafter as the R3 sample. The cellulose of the R3 sample had an average degree of polymerization of 106, such a crystallinity that $x_I$ was 0.80 and $x_{II}$ was 0, and an average particle diameter of 0.18 μm, and the transmittance of dispersion was 36%. The particle of the R3 sample obtained in the present Comparative Example had a very small particle diameter but a very high crystallizability, and hence, did not correspond to the dispersion of the present invention. Because of the treatment in sulfuric acid under severe conditions, it is inferred that a sulfone group having an anion has been introduced onto the particle surface. Therefore, repulsion between particles was caused and association between particles was difficult to cause, whereby a dispersion having a low viscosity was formed, and hence, there was substantially no thickening effect as expected for the dispersion of the present invention.

EXAMPLE 10

Wood pulp having a degree of polymerization of 760 was dissolved in a 75% aqueous nitric acid solution at 0° C. so that the cellulose concentration became 6%, and this solution was poured with stirring into water in an amount 5 times the weight of the solution to aggregate the cellulose in the form of floc. This nitric acid dispersion of the material in the form of floc was subjected to hydrolysis at 90° C. for 2 hours, then to sufficient water-washing until the pH of the washings became not less than 4 and thereafter to dehydration to obtain a white and transparent, gel-like product having a cellulose concentration of 6%. This gel-like product was treated by a domestic food processor (knife cutter) for 3 minutes. This sample is referred to hereinafter as S10. The cellulose of the S10 sample had an average degree of polymerization of 40 and such a crystallinity that $x_I$ was 0.02 and $x_{II}$ was 0.12 and an average particle diameter of 0.32 μm, and the transmittance of dispersion was 71%.

EXAMPLE 11

Wood pulp having a degree of polymerization of 760 was dissolved in a 80% aqueous phosphoric acid solution at 10° C. so that the concentration of cellulose became 4%, and this solution was poured with stirring into water in an amount 5 times the weight of the solution to aggregate the cellulose in the form of floc. This phosphoric acid dispersion of the material in the form of floc was subjected to hydrolysis at 90° C. for 2 hours, then to sufficient water-washing until the pH of the washings became not less than 4 and subsequently to dehydration to obtain a white and transparent, gel-like product having a cellulose concentration of 6%. This gel-like product was treated by a domestic food processor (knife cutter) for 3 minutes. This sample is referred to hereinafter as S11. The cellulose of the S11 sample had an average degree of polymerization of 39 and such a crystallinity that $x_I$ was 0.01 and $x_{II}$ was 0.20 and an average particle diameter of 0.64 μm, and the transmittance of dispersion was 65%.

EXAMPLE 12

Wood pulp having a degree of polymerization of 1,200 was dissolved at 0° C. in a 42% aqueous hydrochloric acid solution so that the cellulose concentration became 4%, and this solution was poured with stirring into water in an amount 4 times the weight of the solution to aggregate the cellulose in the form of floc. This hydrochloric acid dispersion of the material in the form of floc was subjected to hydrolysis at 90° C. for 2 hours, then to sufficient water-washing until the pH of the washings became not less than 4 and thereafter to dehydration to obtain a white and transparent, gel-like product having a cellulose concentration of 15%. This gel-like product was treated by a domestic food processor (knife cutter) for 3 minutes. This sample is referred to hereinafter as S12. The cellulose of the S12 sample had an average degree of polymerization of 39, such a crystallinity that $x_I$ was 0 and $x_{II}$ was 0.23 and an average particle diameter of 0.22 μm, and the transmittance of dispersion was 71%.

EXAMPLE 13

Purified cotton linter having a degree of polymerization of 1,200 was dissolved at −5° C. in a 70% aqueous sulfuric acid solution so that the cellulose concentration became 5%. This solution was poured with stirring into water in an amount 2.5 times the weight of the solution to aggregate the cellulose in the form of floc, thereby obtaining a suspension. This suspension was subjected as it was to hydrolysis at 85° C. for 45 minutes, then to sufficient water-washing until the pH of the washings became not less than 4 to obtain a white and transparent, gel-like product having a cellulose concentration of 5.5%. This gel-like product was treated by a domestic food processor (knife cutter) for 3 minutes. This is referred to hereinafter as the S13A sample. Moreover, the S13A sample was diluted with water to a cellulose concentration of 2% and they were mixed in a blender at a revolution rate of 15,000 rpm for 5 minutes. Further, this mixture was repeatedly treated 5 times by an ultrahigh pressure homogenizer in the same manner as in Example 2 to obtain dispersion S13B.

The S13A sample had an average degree of polymerization of 36, such a crystallinity that $x_I$ was 0 and $x_{II}$ was 0.39 and an average particle diameter of 1.6 μm, and the transmittance of dispersion was 57%.

The S13B sample had an average degree of polymerization of 36, such an affinity that $x_I$ was 0 and $x_{II}$ was 0.39 and an average particle diameter of 0.23 μm, and the transmittance of dispersion was 94%.

EXAMPLE 14

Wood pulp having a degree of polymerization of 760 was dissolved at −5° C. in a 65% aqueous sulfuric acid solution so that the cellulose concentration became 5%. This solution was poured with stirring into water in an amount 2.5 times the weight of the solution to aggregate the cellulose in the form of floc, thereby obtaining a suspension. This suspension was filtered through a glass filter to obtain a dehydrated cake containing sulfuric acid. This dehydrated cake was introduced into water at 90° C. in an amount 2 times the weight of the cake, then subjected to hydrolysis at this temperature for 30 minutes with gradual stirring, then to sufficient water-washing until the pH of the washings became not less than 4 and thereafter to dehydration to obtain a white and transparent, gel-like product having a cellulose concentration of 6.2% by weight. This gel-like product was treated by a domestic food processor (knife cutter) for 3 minutes and the sample thus obtained is referred to hereinafter as S14A.

Moreover, the S14A sample was diluted with water to a cellulose concentration of 2% and they were mixed in a blender at a revolution rate of 15,000 rpm for 5 minutes. Further, this mixture was treated 4 times (4 Pass) by an ultrahigh pressure homogenizer in the same manner as in Example 2 to obtain a gel-like product. This sample is referred to hereinafter as S14B.

The S14A sample had an average degree of polymerization of 43, such a crystallinity that $x_I$ was 0 and $x_{II}$ was 0.27, and an average particle diameter of 3.6 μm, and the transmittance of dispersion was 51%. The S14A sample was pasty but had no sticky feel at all, and was slightly transparent.

The S14B sample had an average degree of polymerization of 43, such a crystallinity that $x_I$ was 0 and $x_{II}$ was 0.27, and an average particle diameter of 0.18 μm, and the transmittance of dispersion was 93%.

EXAMPLE 15

A dispersion having a high cellulose concentration was prepared by the following procedure. To the S1 sample of Example 1 was added glycerin in an amount equal to the weight of cellulose, and the resulting mixture was subjected to kneading treatment by kneading apparatus PVK-3 manufactured by Mizuho Kogyo Kabushiki Kaisha for 1 hour. The semitransparent, clay-like dispersion obtained was subjected to low-speed kneading under the conditions of 80° C. and 10 mmHg for about 3 hours to substantially completely remove the water in the dispersion. It was found from the weight change of the dispersion that a dispersion in the form of a solid floc composed of 50% of cellulose and 50% of glycerin was obtained. This dispersion is referred to hereinafter as the S15 sample. Water was added to the S15 sample so that the cellulose concentration became 4% and the resulting dispersion was subjected to dispersing treatment in a blender at a revolution rate of 15,000 rpm for 3 minutes. As a result, a viscous, uniform, semitransparent dispersion was obtained and the height of dispersibility of the S15 sample in water was confirmed.

EXAMPLE 16 AND COMPARATIVE EXAMPLE 4

In order to confirm in the microscopic and macroscopic level that the cellulose of the dispersion of the present invention is more highly finely divided and more highly dispersed than the cellulose particulate obtained by the conventional method, observation was conducted through a scanning probe microscope, a scanning electron microscope and an optical microscope. The S2B sample of Example 2 was diluted with water to prepare a 0.002% dispersion, and this was subjected to ultrasonic treatment for 3 minutes. The dispersion obtained was sampled through a dropping pipette and one drop thereof was allowed to fall on glass for preparation and dried as it was at room temperature. This sample is referred to hereinafter as S16A. The scanning probe microscope picture of the surface of this sample was observed in the Tapping mode™ using Nano Scope IIIa manufactured by Digital Instruments. The surface picture obtained is shown in FIG. 4. From FIG. 4, it has become clear that the cellulose constituting the dispersion of the present invention is fibrilliform cellulose having a width of 10 to 15 nm and a length of hundred to several hundreds nm and the basic particle thereof is composed of the primary particle having a diameter of 10 to 15 nm.

Moreover, it is shown by a scanning electron micrograph of a dry sample of the dispersion that the particulates are highly dispersed and simultaneously associated in the dispersion of the present invention. FIG. 5 shows a scanning electron micrograph of a white sample (referred to hereinafter as the S16B sample) obtained by freeze-drying the S2B sample of Example 2 (cellulose concentration: 2%). From FIG. 5, it is found that in the S16B sample, the fibrilliform particulates are associated with one another to form a fine network structure and it is inferred that taking it into consideration that though freeze-drying was conducted, somewhat aggregation took place in the drying step, a network structure of much more finely dispersed cellulose than in the photograph was formed in the actual dispersion (the S2B sample).

Subsequently, the S1 sample of Example 1 was previously diluted with water to a cellulose concentration of 0.5% and well dispersed using a blender to obtain a S16C sample. The S16C sample and a sample (referred to hereinafter as the R4 sample) prepared by adjusting the cellulose concentration of the R2A sample of Comparative Example 2 to 0.5% in the same manner as above were separately sampled by separate dropping pipettes and 2 to 3 drops thereof were allowed to fall on separate glass plates for preparation, and a cover glass was placed on each of them, and the drops were observed in the state that the sample was not dried. FIG. 2 and FIG. 3 show the micrographs of the S16C sample and the R4 sample, respectively, taken at the same magnification.

From FIG. 3, it can be clearly confirmed that in the R4 sample, needle-like particles are clearly dispersed; however, in the S16C sample in FIG. 2, particle-like material was unable to be confirmed. However, when the S16C sample and the R4 sample were subjected as they were to measurement of average particle diameter by a laser diffraction type particle size distribution measuring apparatus, the average particle diameters were 164 $\mu$m (S16C) and 3.3 $\mu$m (R4), respectively. On the other hand, when the average particle diameters of these samples were measured by the average particle diameter measuring method of the present invention, the average particle diameters were detected as 2.3 $\mu$m (S16C) and 3.2 $\mu$m (R4). From the results of the present Example, it has become clear that the dispersion of the present invention is composed of very small unit particles and these exist in association; however, the degree of association is so loose that deassociation is relatively easily caused by ultrasonic treatment or the like.

EXAMPLE 17 AND COMPARATIVE EXAMPLE 5

It is shown that the cellulose dispersion of the present invention has higher thickening action than the water dispersion of finely divided cellulose obtained by the conventional method and simultaneously has Theological characteristics different from the conventional one.

The S1 sample of Example 1 was diluted to a cellulose concentration of 4% and subjected to treatment by a homomixer for 10 minutes to prepare an S17 sample. The viscosity behaviors of the S17 sample and the R2A sample of Comparative Example 2 were measured using a cone plate type rotaviscometer manufactured by Haake Company (Rheo Stress RS100, cone angle: 40, 35 mm$\phi$, 25° C.).

Figure 6:
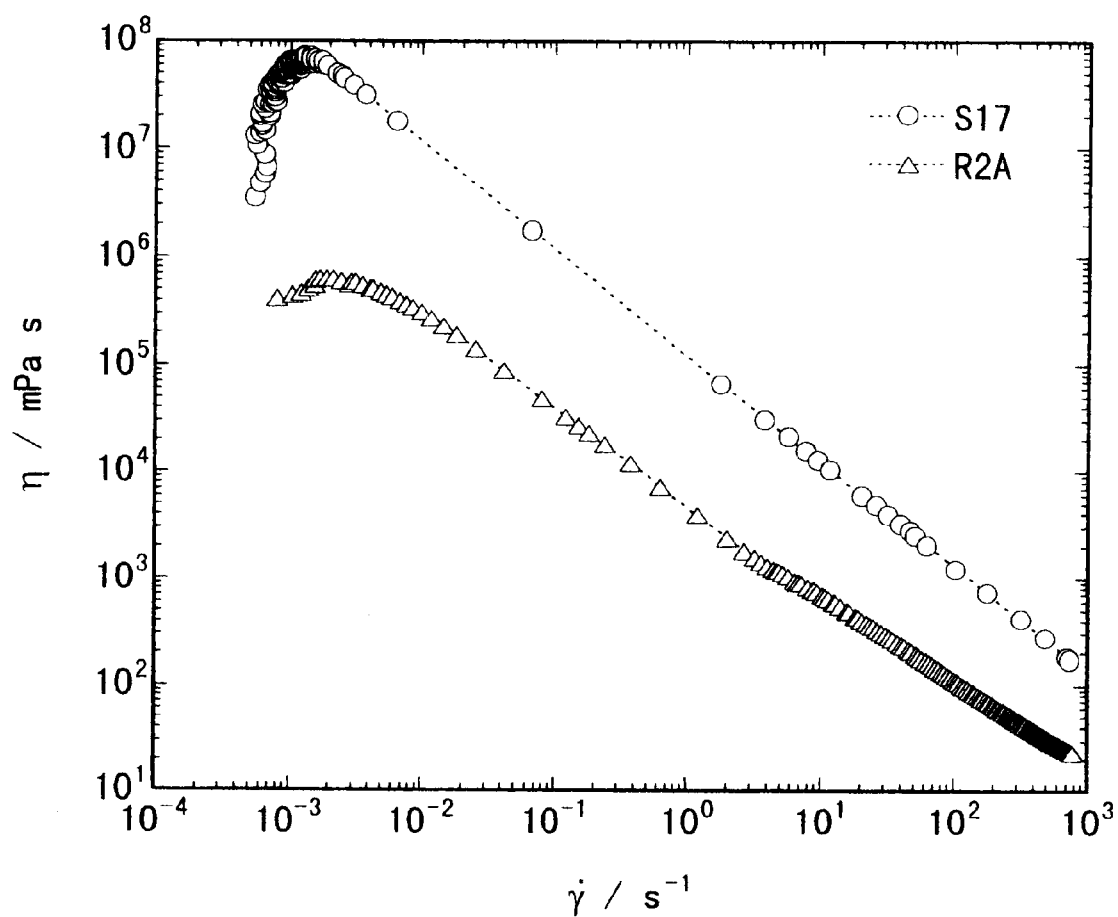
FIG. 6 is a graph showing the shear rate ($\dot{\gamma}$) dependency of the viscosity ($\eta$) in the S17 sample and the R2A sample.
Figure 7:
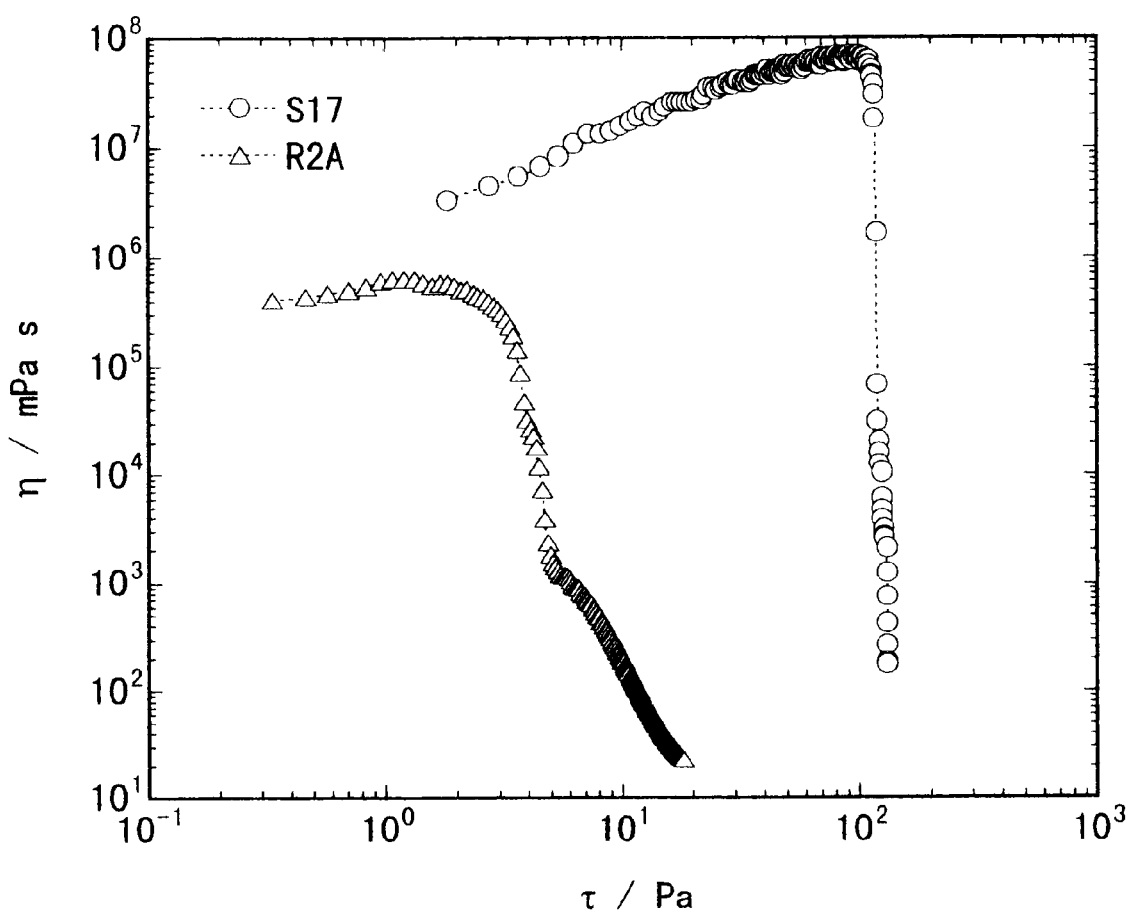
FIG. 7 is a graph showing the shear stress ($\tau$) dependency of the viscosity ($\eta$) in the S17 sample and the R2A sample.

FIG. 6 shows the shear rate ($\gamma$) dependencies of viscosities ($\eta$) of the S17 sample and the R2A sample of Comparative Example 2 and FIG. 7 shows the shear stress ($\tau$) dependencies of the viscosities ($\eta$) of the S17 sample and the R2A sample of Comparative Example 2.

When compared at the same shear rate, the S17 sample has a viscosity about 2 figures higher (102 times higher) than that of the R2A sample. From this result, the water dispersion of the present invention can be expected to have a thickening effect much higher than known heretofore. In the relationship between viscosity and shear force, the two samples show quite different behaviors. That is to say, in the R2A sample, the viscosity lowers step by step as the stress increases through a region in which the Newton viscosity is shown that the viscosity is constant without depending upon the shear stress, while in the S17 sample, the viscosity increases gradually as the stress increases until a certain stress is reached and thereafter lowers at a stretch and clearer thixotropic properties are observed. Such a tendency as seen in S17 is characteristic of a gel which has elasticity together with viscosity, and when allowed to stand, apparently, R2A is fluid while S17 is low in fluidity.

EXAMPLE 18

Figure 8:
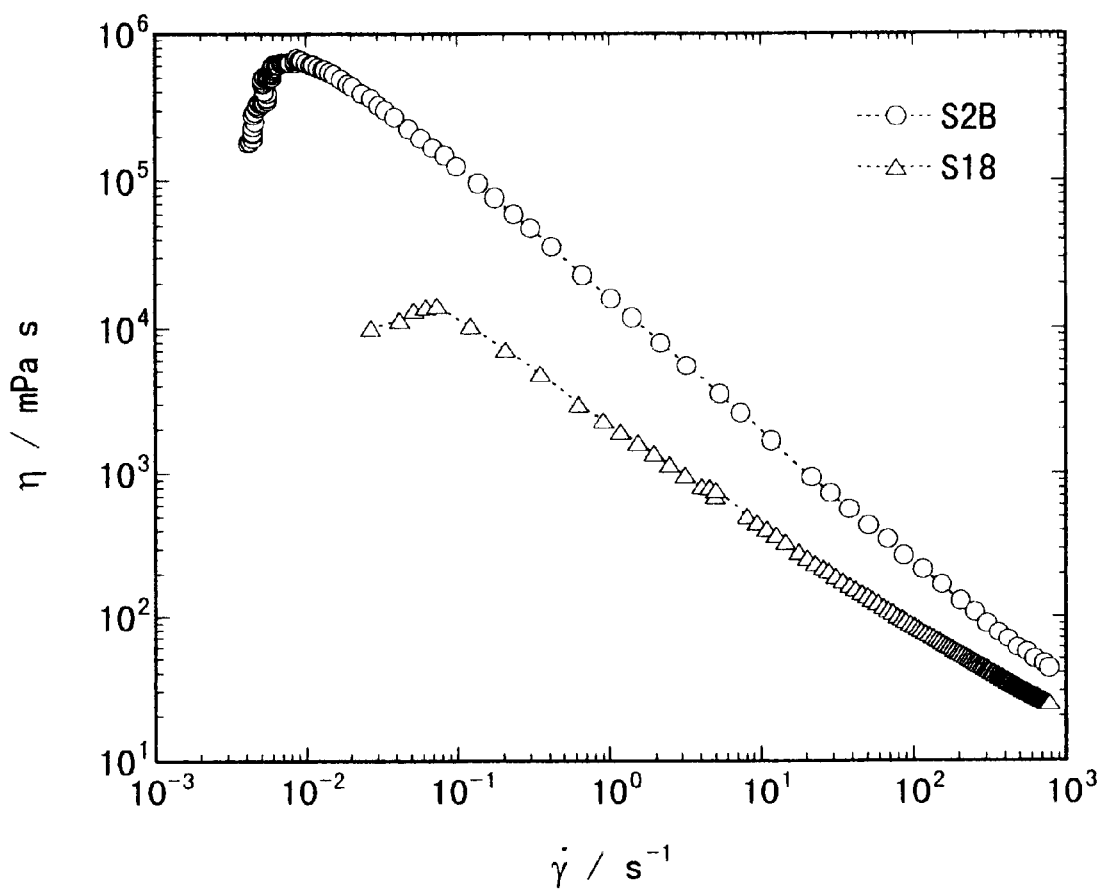
FIG. 8 is a graph showing the shear rate ($\dot{\gamma}$) dependency of the viscosity ($\eta$) in the S2B sample and the S18 sample.
Figure 9:
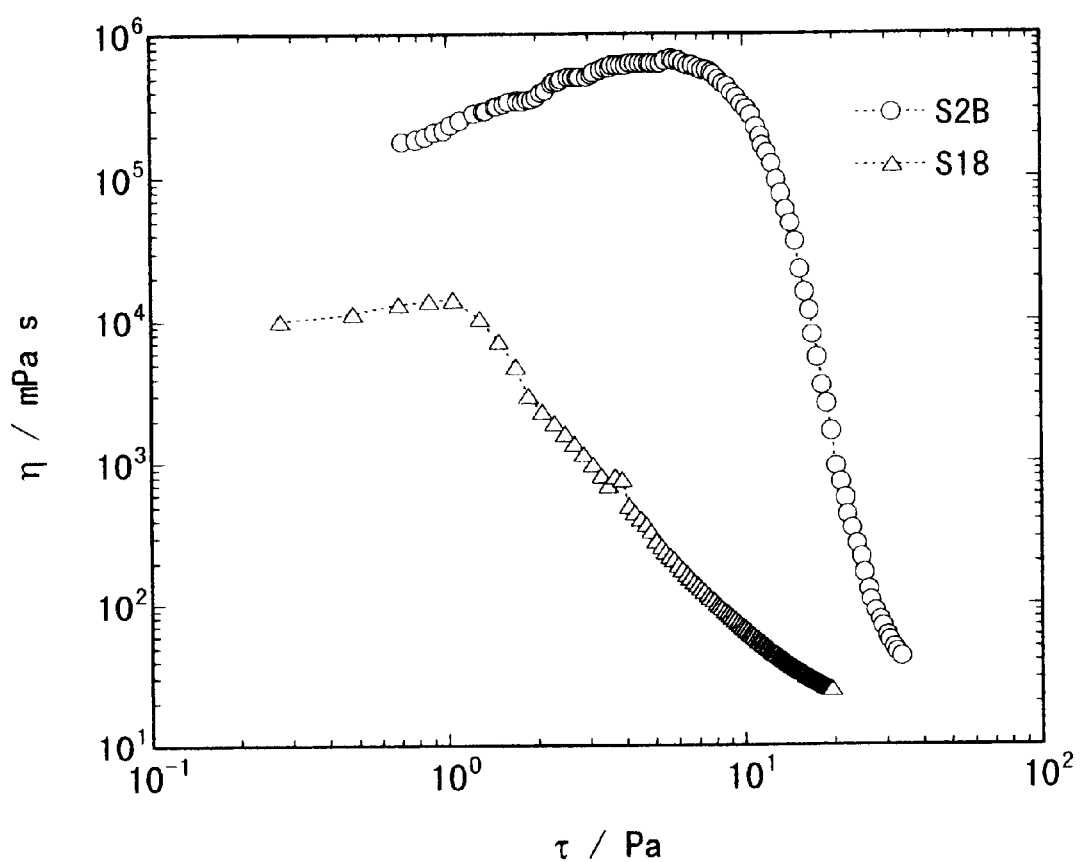
FIG. 9 is a graph showing the shear stress ($\tau$) dependency of the viscosity ($\eta$) in the S2B sample and the S18 sample.

The viscosity behavior of the dispersion S2B sample of Example 2 (cellulose concentration: 2%) was compared with the viscosity behavior of a sample obtained by diluting the S1 sample of Example 1 with water so that the cellulose concentration became 2% and thereafter subjecting the same to mixing treatment in a blender at a revolution rate of 15,000 rpm for 5 minutes (the sample being referred to hereinafter as the S18 sample) using a cone plate type rotaviscometer manufactured by Haake Company (Rheo Stress RS100, cone angle: 4°, 35 mm$\phi$, 25° C.). In FIG. 8 are shown the shear rate ($\gamma$) dependencies of the viscosities ($\eta$) of the S2B sample and the S18 sample and in FIG. 9 are shown the shear stress ($\tau$) dependencies of viscosities ($\eta$) of the S2B sample and the S18 sample.

The S2B sample corresponding to a high-power grinding treatment of the S18 sample has a high viscosity (about 105 mpa·s) corresponding to about 10 times that of the S18 sample, for example, under a shear rate as low as $10^{-1}$ s$^{-1}$; however, the difference is reduced to about 2 times that of the S18 sample under a shear rate as high as $10^3$ s$^{-1}$ and the viscosity is lowered (about 30 to 40 mPa·s). This indicates that not only is the S2B sample so much the better as the thickening agent, but also does it has larger thixotropic properties than the S18 sample.

In addition, even in the relation between viscosity and shear force, the S2B sample maintains a higher viscosity until a higher shear force is reached than the S18 sample, and thereafter has a tendency to lose the viscosity at a stretch. Such a tendency is characteristic of a gel, and suggests that in the S2B sample, a higher network structure is formed. That is to say, it has been proven that the dispersion of the present invention not only exhibits a high transparency when subjected to high-power grinding treatment, but also comes to have a higher performance as a thickening agent.

EXAMPLE 19 AND COMPARATIVE EXAMPLE 6

The following evaluation was carried out in order to prove that as compared with the conventional aqueous water-soluble cellulose solution, the dispersion of the present invention has not a sticky feel when coated on the surface of a material (skin, wall or the like). Four samples of a 3% aqueous solution of each of the S18 sample of Example 18, the S2B sample of Example 2, carboxymethyl cellulose which was a general thickening agent (CMC manufactured by Aldrich Company, substitution: 0.9; weight average molecular weight: 700,000) and hydroxyethyl cellulose (HEC, manufactured Tokyo Kasei Kogyo Kabushiki Kaisha, 4,500 to 6,500 cps (2% aqueous solution, 25° C.)) (the aqueous CMC solution and the aqueous HEC solution are hereinafter referred to as the Comparative Example R6A sample and the Comparative Example R6B sample, respectively) were subjected to evaluation of spinnability and sticky feel when coated on the back of hand. As to the latter, the evaluations of five panelists were totalized. The results are shown in Table 1.

TABLE 1

|  | Sample | Spinnability | Sticky feel |
|---|---|---|---|
| Example | S18 | No | No |
| Example | S2B | No | No |
| Comparative Example | R6A | Yes | Yes |
| Comparative Example | R6B | Yes | Yes |

From the above results, it is shown that the dispersion of the present invention does not have spinnability at all and gives a user a clean touch free from sticky feel. This is considered that the dispersion of the present invention does not cause the thickening action through entanglement of the molecular chains dispersed, but basically develops the thickening effect by the association between particles.

EXAMPLE 20 AND COMPARATIVE EXAMPLE 7

The coating performance of the dispersion of the present invention was compared with the coating performance of a dispersion obtained by the prior art. S2B, S4A and S18 were used as Examples and R2A and R2B as Comparative Examples, and each of them was coated in a thickness of about 60 μm on a glass plate of a size of 2.5 cm×7.5 cm, and thereafter dried in a constant temperature room at 60° C. to obtain four coating samples. The samples obtained were compared with one another in respects of transparency of coating surface, rough feel, crazing at the time of completion of drying and strength of coating film. Here, the evaluation of the degree of adhesion of the coating film to glass surface was effected by repeating three times as to the same place the procedure of strongly rubbing and adhering a cellophane tape on the coating film and then peeling the tape, and thereafter determining how much the coating film has been peeled, and the results obtained are shown in Table 2.

TABLE 2

|  | Coating solution | Transparency | Rough feel | Crazing | Bond strength |
|---|---|---|---|---|---|
| Example | S2B | Transparent | No rough feel | No crazing | No peeling |
| Example | S4A | Transparent | No rough feel | No crazing | No peeling |
| Example | S18 | Semi transparent | No rough feel | No crazing | No peeling |
| Comp. Example | R2A | Opaque | Rough feel | Crazing found | No peeling |
| Comp. Example | R2B | Opaque | Rough feel | No crazing | No peeling |

From Table 2, it is seen that the coating films from the dispersions of the present invention (S2B, S4A and S18) and the coating films from the finely divided cellulose dispersions of the Comparative Examples had a coatability on glass surface and a high adhesiveness to glass surface. However, it has become clear that the coating films from the dispersions of the present invention are superior in performance as to the transparency of coating film and as to whether or not they have a rough feel to the Comparative Examples R2A and R2B. In particular, the coating films obtained from S2B and S4A have had so high a transparency that unless carefully observed, the coating cannot be noticed. Moreover, it has been suggested that the glass plate coated with S2B or S4A can become a new coating material which has both the hydrophilicity of cellulose and the transparency of cellulose because it is not hazed by breathing thereon (anti-fogging effect) or has an antistatic effect.

EXAMPLE 21

The following experiment was conducted for proving that the transparent coating film of Example 20 can be formed even on a hydrophobic plastic film.

Each of three dispersions S2B, S4A and S6b were coated in a thickness of about 60 μm on a commercially available OHP sheet (PET film) using an applicator; however, when the S2B sample which was a water dispersion was used, the film surface repelled the dispersion and good casting was impossible. On the other hand, when the S4A sample or the S6B sample was used, uniform casting was possible. The S4A sample or the S6B sample obtained was coated and dried in a constant temperature room at 60° C. to obtain two coating films (the films obtained by coating the S4A sample and the S6B sample are referred to hereinafter as the S21A sample and the S21B sample, respectively). Both of them were very high in transparency and exhibited anti-fogging properties and antistatic effect, just as Example 20. These two samples were subjected to bonding strength test using a cellophane tape in the same manner as in Example 20. As a result, the coated cellulose film was peeled from the S21A sample, but not peeled at all from the S21B sample. It is considered that in the S21B sample, by the function of the composite latex, the adhesiveness of the film to PET which is hydrophobic has been enhanced.

It has been found that when the dispersion of the present invention is coated on a hydrophobic surface, a cellulose coating high in transparency can be suitablyobtained by preparing a uniform dispersion comprising a water-soluble, organic solvent having a hydrophobicity or by mixing or mixing and dispersing a hydrophobic functional additive.

EXAMPLE 22 AND COMPARATIVE EXAMPLE 8

The following experiment was conducted in order to prove that the coating film obtained using the dispersion of the present invention has a high moisture-retention during drying.

Each of the S2B, S18 and R2A samples were coated on a glass plate in the same manner as in Example 20. Incidentally, the coatings from the S2B and S18 samples are referred to hereinafter as Example 22 and the coating from the R2A sample as Comparative Example 8. The three coating samples obtained were dried in an environment of 120° C. and 1 mmHg for two hours using a vacuum dryer. Thereafter, the samples were taken out of the dryer and their weights were measured as rapidly as possible (W0).

After the weight measurement, the samples were transferred to an environment of 25° C. and 50% RH, and the moisture retention of the coating film was evaluated, as water content, from the weight increase ($\Delta W$) after a lapse of 200 hours. Here, the water content is defined as follows from the weight (W0) of the coating film just after the drying and the weight increase ($\Delta W$) from just after the drying to reaching the moisture absorption equilibrium:

$$\text{Water content} = (\Delta W)/(W0 + \Delta W) \times 100 \qquad (\%).$$

As a reference example, the moisture retention of a regenerated cellulose filament (Benberg, a registered trademark of ASAHI CHEMICAL INDUSTRY CO., LTD.) was also evaluated under the above-mentioned conditions. The results obtained are shown in Table 3.

TABLE 3

|  | Coating solution | Water content (%) |
| --- | --- | --- |
| Example | S2B | 14.1 |
| Example | S18 | 14.0 |
| Comp. Example | R2A | 5.0 |
| Ref. Example | Benberg ® | 12.2 |

The coating film of the present invention was higher in moisture retention than the coating film of the Comparative Example. The regenerated cellulose (crystal form: cellulose II type) material exhibited a relatively high moisture retention; however, when it is intended to form a coating film therefrom, in the conventional method, there can be adopted only a method in which a cuprammonium solution or a viscose solution is coated and a coagulating agent or a regenerating agent is allowed to act thereon to form a coating film. On the other hand, it is seen that the coating film obtained by coating such a cellulose I type cellulose as in the R2A sample and drying the same is low in moisture-retention.

EXAMPLE 23 AND COMPARATIVE EXAMPLE 9

It is shown that the dispersion of the present invention has a stability at a lower pH than the cellulose dispersion obtained by the production method known heretofore.

Water and hydrochloric acid were added to the S18 and R2A samples to prepare six 1%-cellulose samples in total which have 3 kinds of pH (=1, 2 and 3), and they were stirred in a homogenizer at a revolution rate of 5,000 rpm for 1 minute, and the samples obtained were placed in transparent glass sample bottles and then allowed to stand as they were on a desk for 100 hours, after which a comparison was made as to the water-separability, namely whether or not the phenomenon of phase-separation between water and the suspension was caused. Whether or not the water-separation has proceeded was judged visually.

Figure 10:
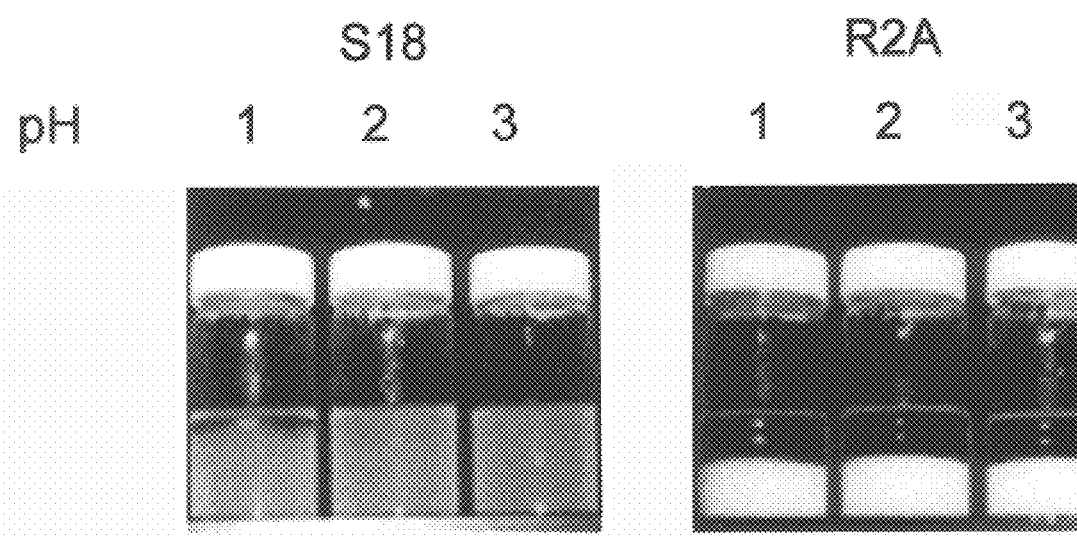
FIG. 10 is a photograph showing the separability of water layer (the state 100 hours after the preparation of dispersion) at pH=1, 2 or 3 of a dilute dispersion (cellulose concentration: 1%) of the S18 sample and the R2A sample.

The results obtained are shown in Table 4. Photographs of the state of each sample taken after the water-separation test are shown in FIG. 10.

TABLE 4

|  | Starting sample | pH | Water-separation |
| --- | --- | --- | --- |
| Example | S18 | 1 | Slightly caused |
| Example | S18 | 2 | Not caused |
| Example | S18 | 3 | Not caused |
| Comp. Example | R2A | 1 | Completely caused |
| Comp. Example | R2A | 2 | Completely caused |
| Comp. Example | R2A | 3 | Completely caused |

The dispersion of the present invention caused no water-separation when pH is not less than 2, while in the Comparative Examples, water-separation was caused in all the circumstances in which the evaluation was conducted.

EXAMPLE 24

The dispersion S2B sample obtained in Example 2 was cast-coated in a thickness of 250 μm on a teflon-coated ferro-plate using an applicator and then dried in an atmosphere at 60° C. Subsequently, the cellulose film formed on the ferro-plate was sampled. This cellulose film was pasted to the sample-holder of a spectrophotometer and subjected to measurement of a transmittance of a wavelength of 660 nm to find that it was 94%, from which it was seen that a film having a very high transparency was obtained (provided that the control light was allowed to pass through air). This means that from the highly transparent cellulose dispersion of the present invention, a transparent, filmy shaped article can be easily prepared by a dry method without using a wet method as in the viscosity coating.

EXAMPLE 25

The dispersion S2B sample obtained in Example 2 was coated in a thickness of 100 μm on a paper for copy use and naturally dried. As compared with untreated paper, a glossy paper was obtained. For comparing the printing properties of this treated paper with the untreated paper, they were printed using a laser type printer (a dye ink) and as a result, it was found that the treated paper could be printed in deeper color and more clearly. It is inferred therefrom that by coating the dispersion of the present invention on the paper for copy, the paper for copy has been changed from the structure that the ink component is easily diffused by capillarity between pulp fibers to such a structure that the capillarity is suitably inhibited.

EXAMPLE 26

Skylet blue (direct dye) was added to the S2B sample obtained in Example 2 in a proportion of 0.1% based on the cellulose and they were subjected to treatment in a homogenizer at a revolution rate of 5,000 rpm for 10 minutes, thereafter cast-coated in a thickness of 250 μm on a teflon-coated ferro-plate using an applicator and then dried in an atmosphere at 60° C. The cellulose film formed on the ferro-plate was sampled to obtain a very clear, blue-colored film.

EXAMPLE 27 AND COMPARATIVE EXAMPLE 10

In order to prove that the dispersion of the present invention is effective as an emulsion stabilizer (emulsifying aid), the following experiment was conducted.

The S2B sample obtained in Example 2 and the R2A sample obtained in Comparative Example 2 (both were water dispersions having a cellulose concentration of 2%) were used and each of them was mixed with liquid paraffin, water and polyoxyethylene (POE) lauryl ether (Emulgen 109P manufactured by Kao Corp.) to prepare water dispersions of the S2B sample and the R2A sample comprising 1.0% of a cellulose, 10% of liquid paraffin and 0.1% of POE lauryl ether. These were subjected to treatment in a homogenizer at a revolution rate of 9,000 rpm at a pressure of 100 mmHg for 15 minutes using a vacuum emulsifying apparatus (PVQ-3UN manufactured by Mizuho Kogyo Kabushiki Kaisha). Subsequently, they were subjected to vacuum defoaming under mild stirring conditions to obtain two white creamy composite cellulose dispersions. The composite cellulose dispersion obtained using the S2B sample is referred to hereinafter as the S27 sample (Example 27) and the composite cellulose dispersion obtained using the R2A sample as R10 (Comparative Example 10). After 200 hours from just after the preparation of each of the samples, each of the samples was coated on the back of hand for checking the state of the composite cellulose dispersion and they were compared in oily feel. The evaluation of oily feel was effected by hearing five panelists. The S27 sample exhibited good casting properties and had substantially no oily feel. On the other hand, the R10 sample had clearly an oily feel and was clearly inferior in spreadability to the S27 sample. This proves that the S27 sample of the present invention is superior in the effect of highly dispersion-stabilizing the oil droplets formed by the homogenizer treatment.

EXAMPLE 28 AND COMPARATIVE EXAMPLE 11

The following experiment was conducted for checking whether or not the dispersion of the present invention has a performance "as the emulsifier per se".

The S1 sample obtained in Example 1 (water dispersion of a cellulose concentration of 6%) and the R2A sample obtained in Comparative Example 2 (water dispersion having a cellulose concentration of 4%) were used, and each of them was mixed with liquid paraffin and water to prepare water dispersions each containing 2.0% of cellulose and 10% of fluid paraffin. These composite cellulose dispersions were treated in a blender at a revolution rate of 15,000 rpm for 5 minutes. A sample in which the S1 sample was the starting material is referred to hereinafter as the S28A sample (Example) and another sample in which the R2A sample was the starting material as the R11A sample (Comparative Example). Thereafter, each of the two samples S28A and R11A was subjected once to ultrahigh pressure homogenizer treatment in the same manner as in Example 2 to obtain the S28B sample (Example) and the R11B sample (Comparative Example), respectively. The properties (the separation state of the water/oil layer) of these four samples and the oily feel and spreadability thereof when coated on the back of hand were evaluated and the results obtained are shown in Table 5. The spreadability was evaluated as to whether the sample had a spreadability though even a little (o) or little spreadability (x).

TABLE 5

| | Sample | Properties | Oily feel when coated | Spreadability when coated |
|---|---|---|---|---|
| Example | S28A | No oil/water separation | Somewhat oily feel | x |
| Example | S28B | No oil/water separation | No oily feel | o |
| Comp. Example | R11A | Oil/water separation found | Very oily feel | x |
| Comp. Example | R11B | Oil/water separation found | Very oily feel | x |

The viscosity of the composition obtained was in the order of S28B>S28A>R11B>R11A, and particularly, S28B and S28A were creamy and a high thickening effect was also confirmed. By this result, it is proven that the dispersion of the present invention is also effective as an emulsifying agent and unless the conventional emulsifying agent is used, it can allow emulsification to proceed sufficiently. In particular, when it is subjected to the high-power grinding treatment, the emulsification proceeds suitably.

EXAMPLE 29 AND COMPARATIVE EXAMPLE 12

The following experiment was tried for proving that the dispersion of the present invention exhibits a high dispersion stability for inorganic particulates.

Using each of the SI sample of Example 1, the S2B sample of Example 2 and the R2A sample of Comparative Example 2, a water dispersion containing 4.0% of titanium dioxide particulate and 1.0% of cellulose was prepared, and subjected to mixing treatment in a blender at a revolution rate of 15,000 rpm for 10 minutes. Here, as the titanium dioxide particulate, there was used lutile type TTO-51(C) (primary particle diameter: 0.03 to 0.05 μm) manufactured by ISHIHARA SANGYO KAISHA, LTD. Samples obtained from the S1 sample, the S2B sample and the R2A sample are referred to hereinafter as the S29A sample, the S29B sample and the R12A sample, respectively. The water separation state was evaluated 200 hours after the treatment in the blender of these three samples to find that S29A and S29B did not show water separation at all and were uniform, white, creamy products, while in R12A, water separation was confirmed and it was confirmed visually that aggregation was partially caused.

The same mixing experiment was further conducted about particulate silica. Using each of the S1 sample of Example 1, the S2B sample of Example 2 and the R2A sample of Comparative Example 2, a water dispersion containing 4.0% of particulate silica and 1.5% of a cellulose was prepared and subjected to mixing treatment in a blender at a revolution rate of 15,000 rpm for 10 minutes. Here, as the particulate silica, there was used Sunsphere H-31 (average particle diameter: 3.7 μm) manufactured by Asahi Glass Co., Ltd. The samples obtained from the S1B sample, the S2B sample and the R2A sample are referred to hereinafter as the S29C sample, the S29D sample and the R12B sample, respectively. The water separation states of these three samples 200 hours after the treatment in the blender were evaluated to find that S29C and S29D were quite free from water separation and were uniform, white dispersions, while in R12B, water separation was clearly confirmed. By these results, it has been confirmed that the dispersion of the present invention has a high dispersion stability even in the case of the inorganic particulate.

EXAMPLE 30

To the S2B sample of Example 2 was added an ink (red, yellow, blue) contained in a commercially available color ink cartridge (Epson Machjet Color) and they were mixed by the vacuum emulsifying apparatus of Example 27, and the compatibility of them was checked.

In all the inks, a transparent, gel-like colored product was obtained until the addition amount reached about 10% by weight based on the cellulose. In the case of the red ink and the yellow ink, they were uniformly miscible even when the addition amount was 30% by weight. In the case of the blue ink, phase separation was caused in 30% by weight. The sample in which 30% by weight of the red ink was added was less in ink-stain than the original ink.

EXAMPLE 31 AND COMPARATIVE EXAMPLE 13

In the present Example, an example of preparing the cellulose particulate of the present invention which can be obtained from the dispersion of the present invention is illustrated.

The S1 sample of Example 1 was diluted with water and they were subjected to mixing treatment in a bender at a revolution rate of 15,000 rpm for 5 minutes to obtain four samples in total whose cellulose concentrations were 1, 2, 3 and 4%. They are hereinafter referred to in this order as the S31a sample, the S31b sample, the S31c sample and the S31d sample. These four samples and the R2A sample of Comparative Example 2 were diluted with water to a cellulose concentration of 2% and then subjected to treatment in a blender at a revolution rate of 15,000 rpm for 5 minutes, after which each of the resulting dispersions (referred to hereinafter as the R13* sample) was dried by a spraying type spray dryer (Model SD-1000 manufactured by Tokyo Rika Kikai Kabushiki Kaisha) by a spray drying method to obtain a white powder. The inlet temperature and the outlet temperature were controlled to 155° C. and 85 to 90° C., respectively, and each of the samples was fed at a feeding rate of 15 ml/min to the spray nozzle to recover a white powder collected in a recovery flask. The white powders obtained from the S31a sample, the S31b sample, the S31c sample, the S31d sample and the R13* sample are referred to hereinafter as the S31A sample, the S31B sample, the S31C sample, the S31D sample and the R13 sample. The properties of the S31A to S31D and R13 samples are shown in Table 6.

TABLE 6

| Sample name | S31A | S31B | S31C | S31D | R13 |
|---|---|---|---|---|---|
| Cellulose conc. of starting solution | 1 | 2 | 3 | 4 | 5 |
| average particle diameter ($\mu$m) | 1.5 | 2.3 | 3.5 | 4.2 | 3.2 |
| L/D | 1.0 | 1.0 | 1.1 | 1.1 | 1.9 |
| Coefficient of aggregation | 2.2 | 1.6 | 1.4 | 1.3 | 1.8 |

Moreover, each of the particles of the S31A to S31D samples had an average particle diameter of 38 and such a crystallinity that $x_I$ was 0 and $x_{II}$ was 0.28. The particle of the R13 sample had an average particle diameter of 120 and such a crystallinity that $x_I$ was 0.66 and $x_{II}$ was 0.

Figure 11:
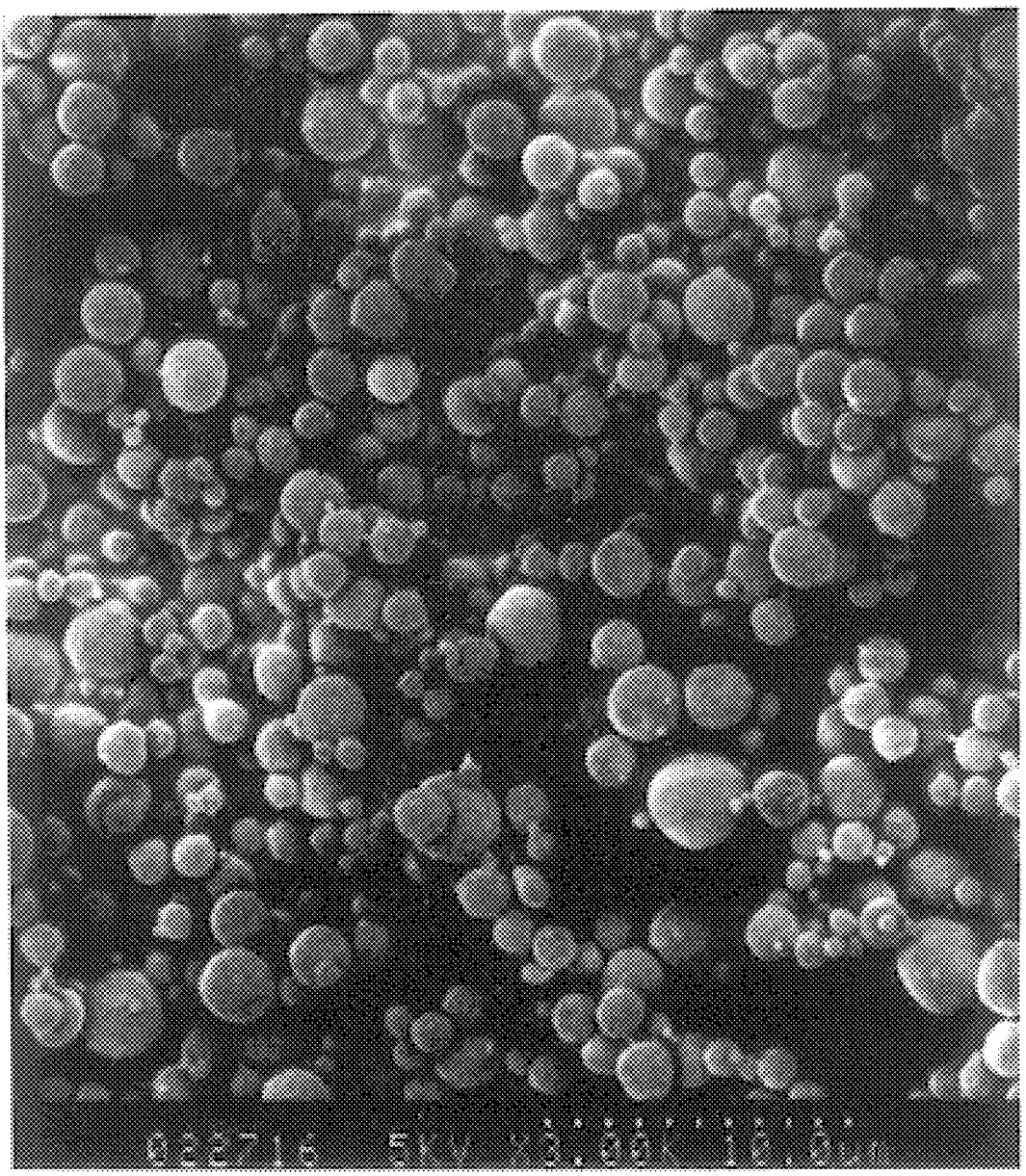
FIG. 11 is a scanning electron micrograph of the S31B sample.
Figure 12:
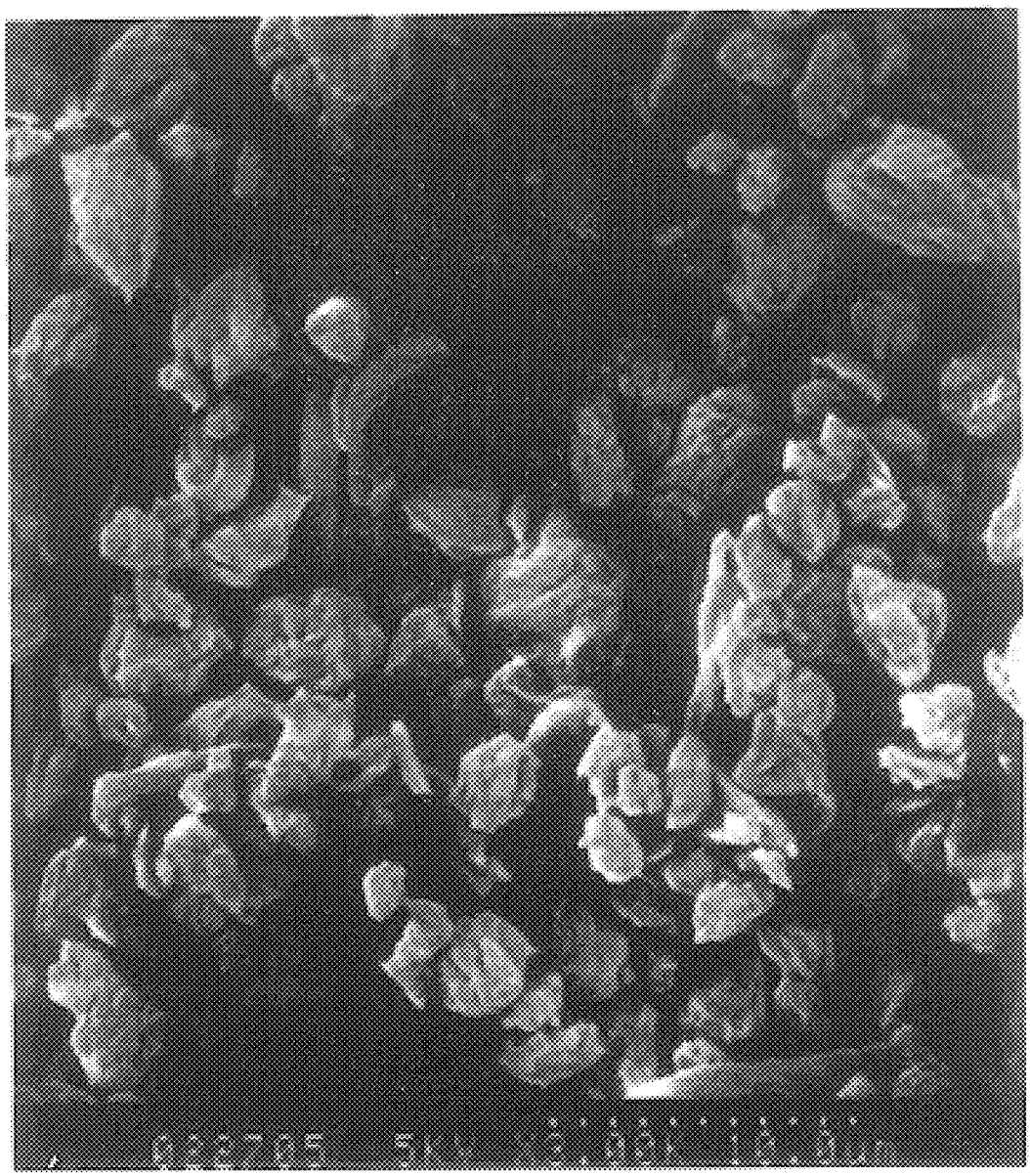
FIG. 12 is a scanning electron micrograph of the R13 sample.

The cellulose particulates of the S31A to S31D samples were touched with a finger to check the feel thereof. They were smooth and had little rough feel. Scanning electron micrographs of the S31B sample and the R13 sample obtained from the same dispersions of a cellulose concentration of 2% are shown in FIG. 11 and FIG. 12, respectively.

Moreover, 0.2 g of each of the S31A to S31D samples was press molded at a pressure of 100 kgf/cm$^2$ by a tablet machine to find that all of them were good in moldability.

Furthermore, the samples after the press molding under the above conditions were powdered in a mortar and these powder samples were subjected to microscopic examination by a scanning electron microscope to find that there were found no cases in which particles were fractured and all the particulates maintained completely the spherical shape before the press molding. The L/D values of the powders recovered after the press molding of the S31A to S31D samples were evaluated to find that they were not more than 1.2 in all cases.

EXAMPLE 32

The S2B sample of Example 2 (cellulose concentration: 2%) was subjected to granulation and drying by a spray dryer under the same conditions as in Example 31 to obtain a while powder which is referred to hereinafter as the S32 sample.

The S32 sample had an average particle diameter of 2.7 $\mu$m, an L/D value of 1.0 and a coefficient of aggregation of 1.7. Moreover, the particle of the S32 sample had an average degree of polymerization of 38 and such a crystallinity that $x_I$ was 0 and $x_{II}$ was 0.28. In addition, the L/D value after the S32 sample was press molded at a pressure of 100 kgf/cm$^2$ was 1.0.

EXAMPLE 33

The S31d sample of Example 31 (cellulose concentration: 4%) was dried using a disc type spray dryer by a spray drying method to obtain a white powder. The inlet temperature and the outlet temperature were controlled to 160° C. and 85 to 90° C., respectively, and each of the samples was fed to the disc portion at a feeding rate of 40 ml/min, and then spray dried, after which a white powder collected in a bag filter was recovered. The white powder obtained is referred to hereinafter as the S33 sample. The S33 sample had an average particle diameter of 17 $\mu$m, an L/D value of 1.1 and a coefficient of aggregation of 1.2. Further, the cellulose particulate of the S33 sample had an average degree of polymerization of 38 and such a crystallinity that $x_I$ was 0 and $x_{II}$ was 0.28. The L/D value after the press molding at a pressure of 100 kgf/cm$^2$ was 1.1.

This S33 sample was smooth when touched with a finger and had little rough feel. On the other hand, as a reference example, an MCC particulate having an average particle diameter of about 50 $\mu$m had a rough feel when was touched with a finger.

EXAMPLE 34

Using the S31B sample obtained in Example 31, a pseudofoundation having the following composition was prepared.

<Composition>
Group A: 12% of the S31B cellulose particulate, 5% of titanium oxide, 10% of pulverized titanium oxide, 20% of kaolin, 0.02% of red iron oxide, 0.2% of yellow iron oxide and 0.5% of black iron oxide
Group B: 6% of carnauba wax
Group C: 3% of octyl methoxycinnamate, 2% of sorbitan sesquiisostearate, 30% of liquid paraffin and 12% of methyl polysiloxane
<Preparation Method>
Firstly, the Group C components were mixed at room temperature in a vacuum dissolving apparatus, and thereto were added the Group A components, after which they were mixed and dispersed. To this mixture were added the Group B components and the resulting mixture was mixed and dissolved at 90° C., and thereafter poured into a petri dish and then cooled to obtain an oily pseudofoundation.
<Evaluation>
This pseudofoundation was used by five female panelists of twenties to thirties in a tentative manner. They were unable to make a detailed examination; however, their general evaluation was that they did not feel physical disorder to skin but it had a dampish feel.

EXAMPLE 35

In the present Example, a cellulose composite finely divided particle containing a metal oxide having an ultraviolet screening ability was prepared.

To the S31a sample obtained in Example 31 (cellulose concentration: 1%) was added a titanium oxide particulate in such an amount as to become 40% based on the cellulose, and they were subjected to mixing treatment in a blender at a revolution rate of 15,000 rpm for 5 minutes. This mixture was subjected four times to treatment by an ultrahigh pressure homogenizer to obtain a dispersion which is a sample for spray drying. This dispersion was dried by the above-mentioned spraying type spray dryer to obtain a white powder sample S35.

The S35 sample was a spherical particulate having an average particle diameter of 3.0 μm and an L/D value of 1.1 and had a coefficient of aggregation of 2.3. Moreover, the L/D value after press molding at a pressure of 100 kgf/cm$^2$ was 1.1.

EXAMPLE 36

In the present Example, a containing cellulose composite particulate containing glycerin high in moisture retention was prepared.

Glycerin was added to the cellulose dispersion S31b sample (cellulose concentration: 2%) obtained in Example 31 so that the proportion of glycerin to the cellulose became 20% and they were subjected to mixing treatment in a blender at a revolution rate of 15,000 rpm for 5 minutes and then dried by the spraying type spray dryer mentioned above. The cellulose composite particulate obtained (referred to hereinafter as the S36 sample) was observed through a scanning electron microscope to find that it was in the form of a true sphere and had an average particle diameter of 3.2μ, an L/D value of 1.1 and a coefficient of aggregation of 1.5. Moreover, the L/D value after press molding at a pressure of 100 kgf/cm$^2$ was 1.2. The equilibrium water content of this cellulose composite particulate in an atmosphere at 25° C. at 60% RH was 18%, and it has become clear that there was obtained a particle higher in moisture retention when the equilibrium water content was compared with that of the glycerin-free particle under the same conditions (14.2%).

EXAMPLE 37

In the present Example, a cellulose composite particulate containing dimethylpolysiloxane was prepared for enhancing the spreadability was prepared.

Dimethylpolysiloxane was added to the cellulose dispersion S31b sample obtained in Example 31 (cellulose concentration: 2%) in a proportion to the cellulose of 20% and they were mixed and emulsified in a homogenizer at a revolution rate of 9,000 rpm for 20 minutes, and then dried by the above-mentioned spraying type spray dryer. The particle obtained (referred to hereinafter as the S37 sample) was observed through a scanning electron microscope to find that it was in the form of a true sphere and had an average particle diameter of 3.4μ, an L/D value of 1.1 and a coefficient of aggregation of 1.7.

The L/D value of this particle after press molding at a pressure of 100 kgf/cm$^2$ was 1.2.

When the particulate obtained was coated on the back of hand, it had a dampish feel and the spreadability was felt high.

EXAMPLE 38

In the present Example, a cellulose composite particulate high in affinity for skin was prepared.

Lecithin was added to the cellulose dispersion S31b sample obtained in Example 31 (cellulose concentration: 2%) in a proportion to the cellulose of 20% and they were subjected to mixing treatment in a blender at a revolution rate of 15,000 rpm for 5 minutes, and then two times to mixing and grinding treatment using an ultrahigh pressure homogenizer in the same manner as in Example 2. The composite cellulose dispersion obtained was dried by the above-mentioned spraying type spray dryer. The particle obtained (referred to hereinafter as the S38 sample) was observed through a canning electron microscope to find that it was in the form of a true sphere and had an average particle diameter of 2.5μ, an L/D value of 1.1 and a coefficient of aggregation of 2.0. The L/D value after press molding at a pressure of 100 kgf/cm$^2$ was 1.2. When the particulate obtained was coated on the back of hand, it had no feeling of physical disorder such as a rough feel or the like and had a dampish feel. Lecithin has a moisture retaining action, an irritation-relaxing action and an age resisting action and hence can be applied to cosmetics such as foundation and the like.

EXAMPLE 39

In the present Example, a cellulose composite particulate containing a black pigment was prepared.

Carbon black was added to the cellulose dispersion S31b sample obtained in Example 31 (cellulose concentration: 2%) in a proportion to the cellulose of 15% and they were subjected to mixing treatment in a blender at a revolution rate of 15,000 rpm for 5 minutes and then once to mixing and grinding treatment using an ultrahigh pressure homogenizer in the same manner as in Example 2. This composite cellulose dispersion was dried by a spraying type spray dryer. The particle obtained (referred to hereinafter as the S39 sample) was observed through a scanning electron microscope to find that it was in the form of a true sphere and had an average particle diameter of 2.5μ, an L/D value of 1.1 and a coefficient of aggregation of 1.8. The L/D value after press molding at a pressure of 100 kgf/cm$^2$ was 1.1. The particulate obtained had a deep black color.

EXAMPLE 40

In the present Example, a cellulose composite particulate containing geraniol which is a perfume component was prepared.

To the cellulose dispersion S31b sample obtained in Example 31 (cellulose concentration: 2%) was added geraniol which is a perfume component in a proportion to the cellulose of 1% and they were subjected to mixing treatment in a blender at a revolution rate of 15,000 rpm for 5 minutes, and then dried by the above-mentioned spraying type spray dryer. The particle obtained (referred to hereinafter as the S40 sample) was observed through a scanning electron microscope to find, as a result, that it was in the form of a true sphere and had an average particle diameter of 2.4μ, an L/D value of 1.0 and a coefficient of aggregation of 1.5. The L/D value after press molding at a pressure of 100 kgf/cm$^2$ was 1.1. The particulate obtained had an aroma of rose and contained the aroma component in the interior of the cellulose base material, and hence, had a slow releasability.

EXAMPLE 41

In the present Example, a cellulose composite particulate containing a coloring matter was prepared.

Rhodamine B which is a red coloring matter was added to the cellulose dispersion S31b sample obtained in Example 31 (cellulose concentration: 2%) in a proportion to the cellulose of 1% and subjected to mixing treatment in a blender at a revolution rate of 15,000 rpm for 5 minutes and then dried using a spray dryer. The red particle obtained (referred to hereinafter as the S41 sample) was observed through a scanning electron microscope to find, as a result, that it was in the form of a true sphere and had an average particle diameter of 2.8μ, an L/D value of 1.0 and a coefficient of aggregation of 1.6. The L/D value after press molding at a pressure of 100 kgf/cm² was 1.0. This particulate can be utilized as a substrate for cheek rouge.

Industrial Applicability

The cellulose dispersion of the present invention has such various functions as not to be able to be reached by the conventional finely divided cellulose dispersions, such as (1) dispersion stability, thickening properties, thixotropic properties, moisture retention, shape retention and the like, and in addition, (2) high transparency, (3) excellent coating film formability, (4) excellent emulsion stability and surface activating properties, and (5) no sticky feel and the like. Moreover, the cellulose particulate and cellulose composite particulate of the present invention obtained from the above-mentioned dispersion are characterized in that they are substantially in the form of a true sphere, small in particle diameter, difficult to aggregate and high in particle strength. Therefore, they had no rough feel, are excellent in rolling properties, excellent in dispersibility and can resist against press molding and the like, and in addition, it has been made possible to provide a cellulose particulate and cellulose composite particulate which have also, in combination therewith, the characteristics of the functional additive added thereto.

Accordingly, the dispersion of the present invention can be widely utilized as a drug-forming adjuvant, a cosmetic additive, a binder for various molding purposes, a filter aid and a support for sustained release drug, and the like.

What is claimed is:

1. A cellulose dispersion which is a dispersion comprising a dispersing medium and a cellulose having crystal forms of cellulose I and cellulose II, wherein a crystallinity of cellulose I is not more than 0.1 and a crystallinity of cellulose II is not more than 0.4 and wherein the average particle diameter of the cellulose in the dispersion is not more than 5 μm.

2. The cellulose dispersion according to claim 1, wherein the average degree of polymerization (DP) is not more than 100 and when the cellulose concentration of the cellulose dispersion is adjusted to 0.05% by weight, the transmittance of the dispersion to a visible light of a wavelength of 660 nm is not less than 40%.

3. The cellulose dispersion according to claim 2, wherein the average particle diameter of the cellulose is not more than 2 μm.

4. The cellulose dispersion according to claim 1, wherein when the cellulose concentration is adjusted to 0.05% by weight, the transmittance of the dispersion to a visible light of a wavelength of 660 nm is not less than 80%.

5. The cellulose dispersion according to claim 2, wherein when the cellulose concentration is adjusted to 0.05% by weight, the transmittance of the dispersion to a visible light of a wavelength of 660 nm is not less than 80%.

6. The cellulose dispersion according to claim 2, 4 or 5, wherein the dispersing medium is water and/or an organic solvent.

7. The cellulose dispersion according to claim 5, wherein the organic solvent is a water-soluble alcohol.

8. A composite cellulose dispersion which comprises the cellulose dispersion according to claim 1, 2, 4 or 5 and a functional additive compatible with the dispersing medium, wherein when the cellulose concentration in the composite cellulose dispersion is adjusted to 0.05% by weight, the transmittance of the dispersion to a visible light of a wavelength of 660 nm is not less than 40%.

9. The composite cellulose dispersion according to claim 8, wherein the transmittance is not less than 80%.

10. The composite cellulose dispersion according to claim 8, wherein the functional additive is selected from the group consisting of a polyhydric alcohol, a water-soluble polysaccharide, a water-soluble polymer and a water-soluble perfume.

11. A process for producing a cellulose dispersion, which comprises dissolving a cellulose in an aqueous inorganic acid solution to prepare a cellulose solution, reprecipitating the cellulose solution in water or a coagulating agent containing not less than 50% by weight of water to prepare a cellulose suspension, subjecting the cellulose in the suspension to acid hydrolysis treatment, and subsequently removing the acid from the suspension.

12. A process for producing a cellulose dispersion, which comprises dissolving a cellulose in an aqueous inorganic acid solution to prepare a cellulose solution, reprecipitating the cellulose solution in water or a coagulating agent containing not less than 50% by weight of water to prepare a cellulose suspension, subsequently preparing a dehydrated cake of the cellulose from the suspension, thereafter introducing the dehydrated cake into water at not less than 50° C. to subject the cellulose to acid hydrolysis treatment and then removing the acid from the suspension.

13. The process for producing a cellulose dispersion according to claim 11, which comprises, after the step of removing the acid from the suspension, further subjecting the suspension to high-power grinding treatment.

14. The process for producing a cellulose dispersion according to claim 12, which comprises, after the step of removing the acid from the suspension, further subjecting the suspension to high-power grinding treatment.

15. The process for producing a cellulose dispersion according to claim 11, 12, 13 or 14, wherein the inorganic acid is sulfuric acid.

16. The process for producing a cellulose dispersion according to claim 11, 12, 13 or 14, wherein the removal of the acid from the suspension is effected by adjusting the pH of the suspension to not less than 2.

17. The process for producing a cellulose dispersion according to claim 11, 12, 13 or 14, wherein the water in the cellulose dispersion obtained by removing the acid is replaced with a water-soluble organic solvent.

18. The process for producing a cellulose dispersion according to claim 11, 12, 13 or 14, wherein a functional additive is added to the cellulose dispersion obtained by removing the acid.

19. The process for producing a composite cellulose dispersion according to claim 18, wherein after the step of adding the above functional additive, the dispersion is further subjected to high-power grinding treatment.

20. A cellulose particulate which is composed of a cellulose having crystal forms of cellulose I and cellulose II, wherein a crystallinity of cellulose I is not more than 0.1 and a crystallinity of cellulose II is not more than 0.4, and which has an average particle diameter of 0.2 to 20 μm, a ratio of long diameter (L) to short diameter (D) as observed through a scanning electron microscope (L/D) of not more than 1.2 and a coefficient of aggregation of 1.0 to 3.0, provided that the coefficient of aggregation=(average particle diameter calculated from the volume reduced distribution obtained by a laser diffraction-scattering type particle size distribution measuring apparatus)/(average particle diameter of volume reduction by a scanning electron microscope).

21. The cellulose particulate according to claim 20, wherein the average degree of polymerization (DP) is not more than 100 and the L/D value after pressing at a pressure of 100 kgf/cm² is not more than 1.2.

22. A cellulose composite particulate which is a particulate in which at least one functional additive is dispersed in the cellulose particulate according to claim 20 or 21 and which particulate has an average particle diameter of 0.2 to 20 μm, a ratio of long diameter (L) to short diameter (D) as observed through a scanning electron microscope (L/D) of not more than 1.2 and a coefficient of aggregation of 1.3 to 3.0.

23. The cellulose composite particulate according to claim 20, wherein the functional additive is at least one member selected from the group consisting of an oil type compound, a water-soluble polymer, a humectant, a surface active agent, a metal oxide, an ultraviolet screener, an inorganic salt, a metal powder, a gum, a dye, a pigment, carbon black, a silica compound, a latex, an emulsion, an amino acid, a perfume and an antiseptic agent.

24. A process for producing a cellulose particulate, which comprises subjecting the cellulose dispersion according to claim 1, 2, 3, 4 or 5 to granulation and drying by a spray drying method.

25. A process for producing a cellulose composite particulate, which comprises mixing the cellulose dispersion according to claim 1, 2, 3, 4 or 5 with at least one functional additive and then subjecting the resulting mixed liquid to granulation and drying by a spray drying method.

26. A cellulose coating film obtained by coating the cellulose dispersion according to claim 1, 2, 3, 4 or 5 on the surface of an inorganic material substrate, a plastic substrate or a paper and then drying the same.

27. A cellulose composite coating film obtained by coating the composite cellulose dispersion according to claim 7, on the surface of an inorganic material substrate, a plastic substrate or a paper and then drying the same.

28. The composite cellulose dispersion according to claim 8, wherein the functional additive is selected from the group consisting of a polyhydric alcohol, a water-soluble polysaccharide, a water-soluble polymer and a water-soluble perfume.

29. A cellulose composite coating film obtained by coating the composite cellulose dispersion according to claim 9 on the surface of an inorganic material substrate, a plastic substrate or a paper and then drying the same.

* * * * *